(12) United States Patent
Calapodescu et al.

(10) Patent No.: US 9,749,128 B2
(45) Date of Patent: Aug. 29, 2017

(54) COMPACT FUZZY PRIVATE MATCHING USING A FULLY-HOMOMORPHIC ENCRYPTION SCHEME

(71) Applicant: Xerox Corporation, Norwalk, CT (US)

(72) Inventors: Ioan Calapodescu, Grenoble (FR); Saghar Estehghari, La Tronche (FR); Johan Clier, Meylan (FR)

(73) Assignee: XEROX CORPORATION, Norwalk, CT (US)

( * ) Notice: Subject to any disclaimer, the term of this patent is extended or adjusted under 35 U.S.C. 154(b) by 279 days.

(21) Appl. No.: 14/278,570

(22) Filed: May 15, 2014

(65) Prior Publication Data

US 2016/0119119 A1 Apr. 28, 2016

(51) Int. Cl.
*H04L 9/00* (2006.01)
*G06F 21/62* (2013.01)
*H04L 9/30* (2006.01)

(52) U.S. Cl.
CPC .......... *H04L 9/008* (2013.01); *G06F 21/6227* (2013.01); *H04L 9/30* (2013.01)

(58) Field of Classification Search
CPC ........... G06F 17/30864; G06F 21/6227; G06F 17/30321; G06F 17/30477
See application file for complete search history.

(56) References Cited

U.S. PATENT DOCUMENTS 8,429,421 B2 * 4/2013 Chase ................ G06F 21/6227 380/277
9,202,079 B2 * 12/2015 Kaliski, Jr. ......... G06F 21/6227
2008/0071765 A1 * 3/2008 Ichiriu .............. G06F 17/30985
2010/0042583 A1 * 2/2010 Gervais ................. G06Q 40/08 707/757
2010/0246812 A1 9/2010 Rane et al.
2011/0320481 A1 * 12/2011 Huang ............... G06F 17/2223 707/769

(Continued)

OTHER PUBLICATIONS

Chmielewski et al., Fuzzy Private Matching, Institute for Computing and Infrmation Sciences, 2008, 8 Total Pages.*

(Continued)

*Primary Examiner* — Farid Homayounmehr
*Assistant Examiner* — Christopher C Harris
(74) *Attorney, Agent, or Firm* — Fay Sharpe LLP

(57) ABSTRACT

A method for data matching includes providing two sets of encrypted data elements by converting data elements to respective sets of vectors and encrypting each vector with a public key of a homomorphic encryption scheme. Each data element includes a sequence of characters drawn from an alphabet. For pairs of encrypted data elements, a comparison measure is computed between the sets of encrypted vectors. An obfuscated vector is generated for each encrypted data element in the first set, which renders the first encrypted data element indecipherable when the comparison measure does not meet a threshold for at least one of the pairs of data encrypted elements comprising that encrypted data element. The obfuscated vectors can be decrypted with a private key, allowing data elements in the first set to be deciphered if the comparison measure meets the threshold for at least one of the data elements in the second set.

21 Claims, 8 Drawing Sheets

(56) References Cited

U.S. PATENT DOCUMENTS

| | | | |
|---|---|---|---|
| 2013/0104049 A1* | 4/2013 | Johnston | G06F 21/604 715/741 |
| 2013/0170640 A1 | 7/2013 | Gentry | |
| 2013/0216044 A1* | 8/2013 | Gentry | H04L 9/08 380/277 |
| 2013/0315390 A1 | 11/2013 | Gentry et al. | |
| 2014/0282949 A1* | 9/2014 | Nath | H04L 63/083 726/6 |
| 2015/0088898 A1* | 3/2015 | Branch | G06F 17/30336 707/741 |

OTHER PUBLICATIONS

Brakerski, et al., "Fully Homomorphic Encryption without Bootstrapping," Cryptology ePrint Archive, Report 111/277, http://eprint.iacr.org/, pp. 1-96 (2011).

Chmielewski, et al., "Fuzzy private matching," Third International Conference on Availability, Reliability and Security (ARES 08), pp. 327-334 (2008).

Dijk, "Fully Homomorphic Encryption over the Integers," Cryptology ePrint Archive: Report 2009/616, pp. 1-28 (2010).

Freedman, et al., "Efficient private matching and set intersection," Advances in Cryptology—EUROCRYPT 2004, pp. 1-19 (2004).

Gentry, "Fully Homomorphic Encryption Using Ideal Lattices," Proc. 41$^{st}$ Annual ACM Symposium on Theory of Computing, STOC '09, pp. 169-178 (2009).

Gentry, et al., "Homomorphic Evaluation of the AES Circuit," Cryptology ePrint Archive: Report 2012/099 pp. 850-867 (2012).

Halevi, et al., "Design and Implementation of a Homomorphic-Encryption Library," http://people.csail.mit.edu/shaih/pubs/he-library.pdf, pp. 1-44 (2013).

Halevi, et al., "Helib," GPL source code published on GitHub https://github.com/shaih/HElib p. 1 (2003).

Hu, "Improving the Efficiency of Homomorphic Encryption Schemes," PhD thesis, Virginia Tech, pp. 1-103 (2013).

Paillier, "Public-Key Cryptosystems Based on Composite Degree Residuosity Classes," Advances in Cryptology, (EUROCRYPT '99), pp. 223-238 (1999).

Smart, et al., "Fully Homomorphic SIMD Operations," Cryptology ePrint Archive: Report 2011/133, pp. 1-25 (2011).

Ye, et al., "Efficient fuzzy matching and intersection on private datasets," Information, Security and Cryptology (ICISC 2009), pp. 211-228 (2010).

Gentry, "Gentry's SWHE Scheme," MIT lectures on Homomorphic Encryption and Lattices, pp. 1-5 (2011).

Boneh, et al., "Private Database Queries Using Somewhat Homomorphic Encryption," ACNS 2013: pp. 102-118 (2013).

Wu, et al., "Somewhat Practical Homomorphic Encryption," pp. 1-28, downloaded at cs.stanford.edu/~dwu4/talks/SecurityLunch0214.pdf on May 15, 2014.

* cited by examiner

COMPACT FUZZY PRIVATE MATCHING USING A FULLY-HOMOMORPHIC ENCRYPTION SCHEME

BACKGROUND

The exemplary embodiment relates to data matching when the data to be matched is imperfect, e.g., contains errors, and finds particular application in connection with matching of encrypted data with a fully homomorphic encryption scheme.

Fuzzy Private Matching (FPM) is a useful method for maintaining privacy when a client wishes to make a query in a server's database to find elements that are approximately equal to elements of his own data set. The exchange protocol is such that during all the communication and processing steps, the query remains private (i.e., unknown to the server) and the content of server's database, apart from the matching elements, remains hidden to the client. Such techniques find application in biometrics, where private, personal characteristics, such as fingerprints, DNA, or iris patterns are commonly used to provide authentication and user access control (UAC). Here, exact values are often difficult to measure and thus fuzzy matching is desired, while maintaining the privacy of private data. Similarly, in matching license plate numbers, an optical character recognition (OCR) component may be used to identify a sequence of characters from an image of the license plate, but makes some errors in recognition. Fuzzy matching the OCR-recognized character sequence with a license plate number stored in a database may be desired, while maintaining the private information as secure as possible.

Homomorphic encryption schemes allow a specified mathematical operation to be performed on encrypted data. The resulting ciphertext, when decrypted, contrary to classical encryption schemes, provides a value that is equal to the result of performing the same operation on the original plaintexts. For an encryption scheme $\epsilon$, the values a and b and an operator op, a homomorphic encryption property can be expressed as follows:

$$\epsilon(a) \text{op} \epsilon(b) = \epsilon(a \text{ op} b)$$

The operator can be a standard mathematical operator, such as multiplication or addition. In some cases, the operator can be different on each side of the equation, e.g., the multiplication of encrypted data can correspond to the addition of the plaintext.

An encryption scheme is considered partially homomorphic if only one arithmetic operation is possible (e.g., only addition or only multiplication). Early protocols all make use of partially homomorphic systems. See, for example, Michael J. Freedman, et al., "Efficient private matching and set intersection," EUROCRYPT 2004, pp. 1-19 (2004), hereinafter, "Freedman 2004"); Lukasz Chmielewski, et al., "Fuzzy private matching," ARES 08, pp. 327-334 (2008), hereinafter, "Chmielewski 2008"; and Qingsong Ye, et al., "Efficient fuzzy matching and intersection on private datasets," ICISC 2009, pp. 211-228 (2010), hereinafter, Ye 2010. These references employ a semantically secure, additively homomorphic public-key cryptosystem, such as the Paillier cryptosystem. See, Pascal Paillier, "Public-key cryptosystems based on composite degree residuosity classes," EUROCRYPT99, pp. 223-238 (1999). These systems provide ciphertext additions and scalar multiplication only, but not multiplication between ciphertexts.

An encryption scheme is said to be fully homomorphic (FHE) if it provides a way to compute both addition and multiplication. Other homomorphic operations are possible, e.g., exclusive or in the case of the Goldwasser Micali encryption scheme or vector rotation for the Brakerski-Gentry-Vaikuntanathan (BGV) encryption scheme. See, Zvika Brakerski, et al., "Fully homomorphic encryption without bootstrapping," Cryptology ePrint Archive, Report 2011/277 (2011). Fully homomorphic encryption allows a server to receive encrypted data and perform arbitrarily-complex dynamically-chosen computations on that data while it remains encrypted, despite not having access to the secret decryption key.

The first fully homomorphic encryption scheme to be identified was based on ideal lattices. See, Craig Gentry, "Fully homomorphic encryption using ideal lattices," Proc.41st Annual ACM Symposium on Theory of Computing, STOC '09, pp. 169-178 (2009), hereinafter, "Gentry 2009". The security for this scheme is based on the Closest Vector Problem. Other FHE encryption schemes were later developed, such as BGV. An implementation of BVG is described in Shai Halevi, et al., "Design and implementation of a homomorphic encryption library," MIT Computer Science and Artificial Intelligence Laboratory manuscript (2013), hereinafter, Halevi 2013.

TABLE 1 provides example encryption schemes and the operations permitted.

TABLE 1

Examples of homomorphic schemes

| Cryptosystem | Homomorphic operations | Notes |
| --- | --- | --- |
| Paillier | $\epsilon(a) \cdot \epsilon(b) = \epsilon(a + b \bmod m)$ | m being the modulus part of the public key |
| ElGamal | $\epsilon(a) \cdot \epsilon(b) = \epsilon(a \cdot b)$ | homomorphic multiplication |
| Goldwasser-Micali | $\epsilon(a) \cdot \epsilon(b) = \epsilon(a \oplus b)$ | $\oplus$ being the exclusive-or between a and b |

Some of the homomorphic operations allowed by the BGV cryptosystem over encrypted data include addition, multiplication, right shift, and right rotation.

Freedman 2004 addresses providing FPM in homomorphic protocols and suggest a 2-out-of-3 protocol, based on polynomial encoding, for solving the FPM problem (i.e., the fuzziness threshold is fixed to 2 and the size of a word is fixed to 3). Chmielewski 2008 shows, however, that the 2-out-of-3 protocol proposed by Freedman 2004 is not secure in that the client is able to discover words in the server's set, even if those words are not present in his own. Another problem of the Freedman protocol is how to provide an efficient FPM protocol that will not incur a $\binom{T}{t}$ factor in the communication complexity.

Chmielewski 2008 proposes two other protocols for solving the FPM problem, FPM-CHM1 (a polynomial encoding based protocol) and FPM-CHM2 (based on linear secret sharing). They propose a correct solution for t-out-of-T. Ye 2010 shows, however that FPM-CHM2 is insecure. They propose another solution, based on polynomial encoding and a share-hiding random error-correcting threshold secret sharing scheme, based on interleaved Reed-Solomon codes, referred to as FPM-YE.

Common to all these FPM protocols is that a partially homomorphic encryption scheme is used to provide the computation on encrypted data capability. All of them make reference to the Paillier cryptosystem, which is an additive only scheme (with multiplication allowed only between an encrypted value and a scalar). Additionally, the performance of the protocols still considered secure, in terms of communication and computation time, may be prohibitive for some applications.

There remains a need for an encryption scheme which is secure and which provides acceptable performance for practical applications.

INCORPORATION BY REFERENCE

The following references, the disclosures of which are incorporated herein by reference in their entireties, are mentioned:

Fully homomorphic encryption schemes are described, for example, in U.S. Pub. No. 20130170640, published Jul. 4, 2013, entitled FULLY HOMOMORPHIC ENCRYPTION, by Gentry, and U.S. Pub. No. 20130315390, published Nov. 28, 2013, entitled FAST COMPUTATION OF A SINGLE COEFFICIENT IN AN INVERSE POLYNOMIAL, by Gentry, et al. A variant of BVG encryption is described in U.S. Pub. No. 20130216044, published Aug. 22, 2013, entitled HOMOMORPHIC EVALUATION INCLUDING KEY SWITCHING, MODULUS SWITCHING, AND DYNAMIC NOISE MANAGEMENT, by Gentry, et al.

U.S. Pub. No. 20100246812, published Sep. 30, 2010, entitled SECURE SIMILARITY VERIFICATION BETWEEN ENCRYPTED SIGNALS, by Rane, et al., describes fuzzy matching of encrypted signals.

BRIEF DESCRIPTION

In accordance with one aspect of the exemplary embodiment, a method for data matching includes providing a first set of encrypted data elements, each of the encrypted data elements in the first set having been formed by converting a respective one of a first set of data elements to a set of vectors and encrypting each vector with a public key of a homomorphic encryption scheme. Each data element in the first set includes a sequence of characters drawn from an alphabet. A second set of encrypted data elements is received, each of the encrypted data elements in the second set having been formed by converting a respective one of a second set of data elements to a set of vectors and encrypting each vector with the public key. Each data element in the second set includes a sequence of characters drawn from the alphabet. For each of a plurality of pairs of encrypted data elements, each pair comprising an encrypted data element from the first set and an encrypted data elements second set, the method includes computing a comparison measure between the encrypted vectors of the encrypted data element in the second set and the encrypted vectors of the encrypted data element in the first set. For each encrypted data element in the first set, an obfuscated vector is generated which renders the first encrypted data element indecipherable when the comparison measure does not meet a threshold for at least one of the pairs of data encrypted elements comprising that encrypted data element. The method further includes outputting the obfuscated vectors, whereby when the obfuscated vectors are decrypted with a private key of the homomorphic encryption scheme, only those data elements in the first set for which the comparison measure meets the threshold for at least one of the data elements in the second set are decipherable. At least one of the computing of the comparison measures and generating of the obfuscated vectors is performed with a computer processor.

In accordance with another aspect, a system for data matching includes memory which stores a first set of encrypted data elements, each of the encrypted data elements in the first set having been formed by converting a respective one of a first set of data elements to a set of vectors and encrypting each vector with a public key of a homomorphic encryption scheme. Each data element in the first set includes a sequence of characters drawn from an alphabet. Instructions are stored in memory for receiving a second set of encrypted data elements, each of the encrypted data elements in the second set having been formed by converting a respective one of a second set of data elements to a set of vectors and encrypting each vector with the public key. Each data element in the second set includes a sequence of characters drawn from the alphabet. For each pair of encrypted data elements from the first and second sets, a comparison measure is computed between the encrypted vectors of the encrypted data element in the second set and the encrypted vectors of the encrypted data element in the first set. For each encrypted data element in the first set, the instructions generate an obfuscated vector which renders the first encrypted data element indecipherable when the comparison measure does not meet a threshold for at least one of the pairs of data elements comprising that encrypted data element. The obfuscated vectors are output, whereby when the obfuscated vectors are decrypted with a private key of the homomorphic encryption scheme, only those data elements in the first set for which the comparison measure meets the threshold are decipherable. A processor implements the instructions.

In accordance with another aspect, a method for data matching includes, with a server computer, encrypting a first set of data elements to generate a first set of encrypted data elements, the encrypting comprising converting each of the first set of data elements to a respective set of vectors and encrypting each vector in the set of vectors with a public key of a homomorphic encryption scheme, each data element in the first set of data elements including a sequence of characters drawn from an alphabet. With a client computer, encrypting a second set of data elements to generate a second set of encrypted data elements, comprising converting each of the second set of data elements to a respective set of vectors and encrypting each vector in the set of vectors with the public key, each data element in the second set of data elements including a sequence of characters drawn from the alphabet. With the server computer, the method includes receiving the second set of encrypted data elements. For each of a plurality of pairs of encrypted data elements, each pair comprising an encrypted data element from the first set and an encrypted data element from the second set, the method includes computing a comparison measure between the encrypted vectors of the encrypted data element in the second set and the encrypted vectors of the encrypted data element in the first set. For each encrypted data element in the first set, an obfuscated vector is generated which renders the first encrypted data element indecipherable when the comparison measure does not meet a threshold for at least one of the pairs of data elements comprising that encrypted data element. The obfuscated vectors are output by the server. With the client computer, the obfuscated vectors are decrypted with a private key of the homomorphic encryption scheme, whereby only those data elements in the first set for which the comparison measure meets the threshold for at least one of the data elements in the second set are decipherable.

DETAILED DESCRIPTION

Figure 1:
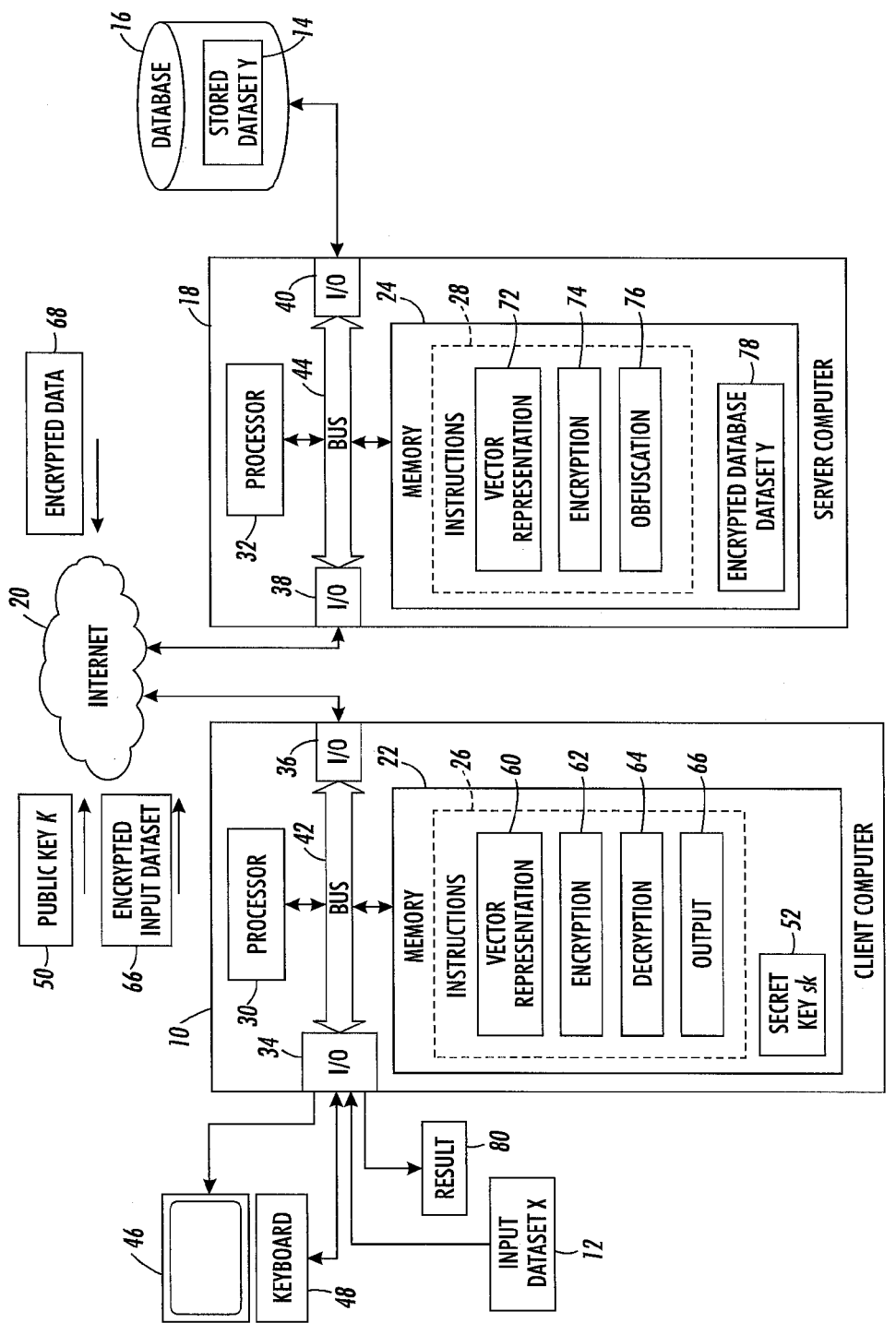
FIG. 1 is a functional block diagram of an environment in which a fuzzy private matching system operates in accordance with one aspect of the exemplary embodiment.

Aspects of the exemplary embodiment relate to a system and method for data matching. The system and method employ a protocol for solving the Fuzzy Private Matching (FPM) problem, which is based on a Fully Homomorphic Encryption (FHE) scheme, allowing both addition and multiplication operations to be performed directly on ciphertext. In one embodiment, the system and method is constructed around lattice-based asymmetric cryptographic primitives (i.e., lattice-based cryptography, as described, for example, in Gentry 2009). The protocol used herein is referred to as Compact Fuzzy Private Matching using Fully Homomorphic Encryption (CFPM-FHE).

The exemplary Fully Homomorphic Encryption scheme can be used additively and multiplicatively to create a FPM protocol. The combined use of the additive and multiplicative properties of the exemplary FHE scheme permits the creation of compact data structures. These are used during the communication part of the protocol to reduce the transmission cost and to ensure a better complexity for the computing part. The use of additions, multiplications, and optionally rotations of the FHE scheme conjointly to provide a compact data structure, a unique characteristic of the CFPM-FHE protocol, has resulted in a more efficient algorithm when compared to existing solutions.

The CFPM-FHE protocol is proven to be secure against the chosen adversary model (i.e., a computationally bounded adversary in a semi-honest environment). It also performs better than the existing algorithms, with at least a quadratic factor for the complexity both in terms of processing time and data space requirements. Experimental results obtained in a proof of concept application, which is based on the BGV homomorphic encryption scheme and implemented in HELib (see, Shai Halevi, et al., "Helib" GPL source code published on GitHub (2013)), are also described.

The exemplary CFPM-FHE protocol can find practical applications in cases where privacy concerns are raised, by private individuals or by companies, regarding data access with "fuzzy queries" (e.g., imperfect input coming from an external sensor) or on "fuzzy data" (e.g., inaccurate or corrupted data). For example, in biometrics, where personal characteristics, such as fingerprints, DNA, or iris patterns are used in queries, the exemplary protocol can be used to implement the service, i.e., matching the "fuzzy data" from the sensor to the database. In this specific use case, the CFPM-FHE protocol provides the security, the UAC (by effectively matching the fuzzy data like fingerprints' features vector to the database), and the privacy (as the service provider is unable to know what was the matching element in the database). Similarly, the system can be used to match fuzzy input coming from Optical Character Recognition (OCR) software, such as incorrect character detection, when working with data captured by video cameras. In this case, a character sequence, such as a license plate in a parking garage, is matched with a set of stored sequences, such as license plates. When a match is found, it may automatically trigger a response, such as the opening of the exit barrier or other operation. In this case, using CFPM-FHE can provide the secure access functionality and keep the privacy of the incoming and outgoing users. As will be appreciated, the CFPM-FHE protocol can be used in other domains where computing similarity of data vectors is desired (e.g., for text clustering or categorization based on a bag-of-words representation).

Figure 2:
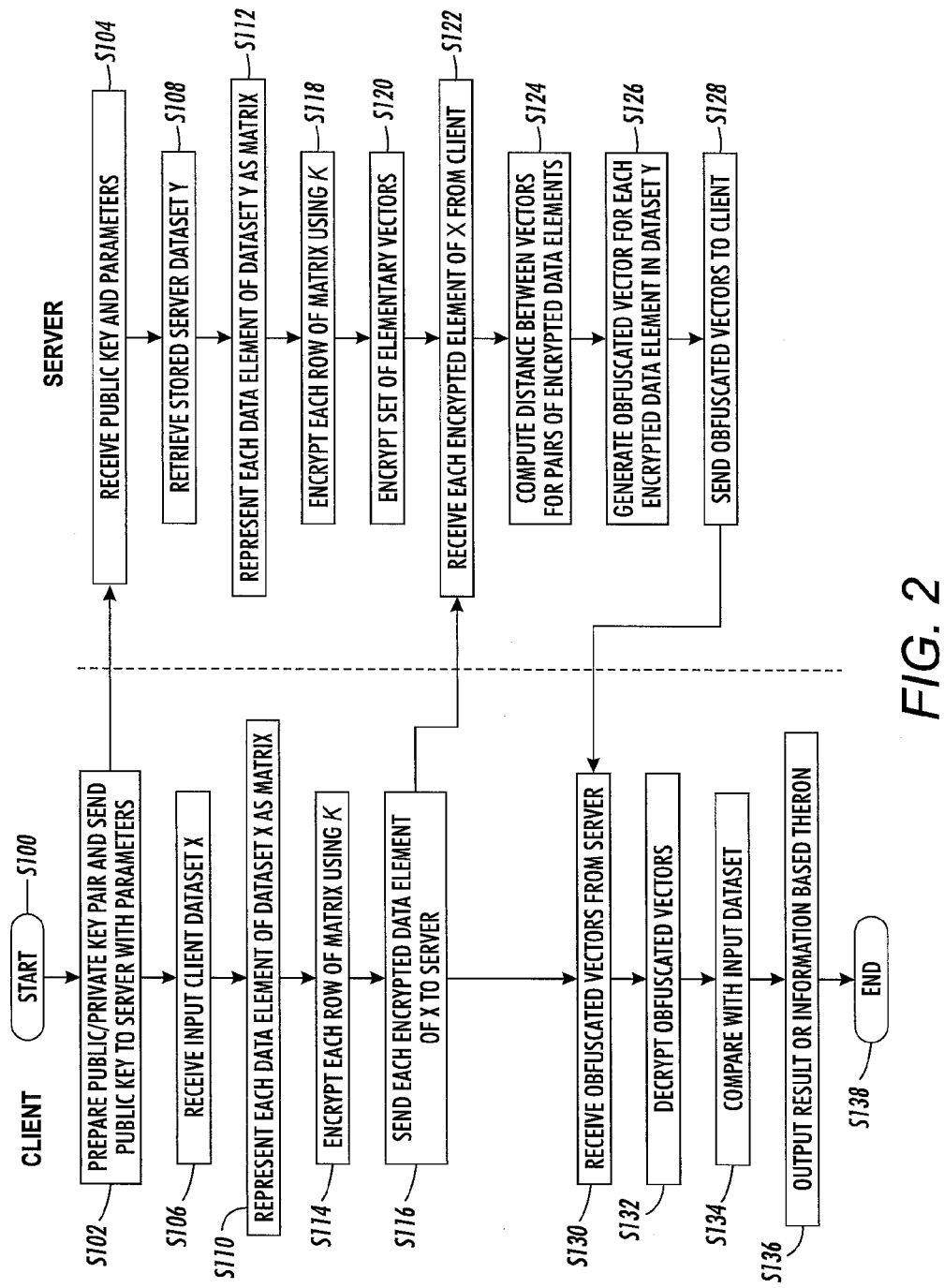
FIG. 2 is a flow chart illustrating a method for fuzzy private matching in accordance with one aspect of the exemplary embodiment.

FIG. 1 illustrates an exemplary environment in which the method illustrated in FIG. 2 can be performed. A client computing device 10 receives (or generates internally) an input dataset X 12 which is to be compared with a stored dataset Y 14, which is stored in a database 16. The database 16 is not accessible to the client computing device 10. The input dataset 12 may include one or more data elements, which may be referred to herein as words, each word including a sequence of characters. The sequence may form an OCR-recognized license plate number or biometric data, or part thereof. The database 16 may store a relatively large number of first data elements, such as license plates/biometric data, in dataset Y 14 that potentially match one or more of the client's (second) set 12. A server computer 18 has access to the dataset Y 14 stored in database 16 and is communicatively connected with the client computing device 10 via a network 20, such as a local area network or wide area network, such as the Internet.

While one client device 10 is shown, there may be many client computing devices 10 communicating with the same server 18. As an example, a set of parking garages capture images of license plates which are OCRed and the detected license plate numbers are sent (in encrypted form) to the server 18 for matching with stored license plate numbers of registered users of the parking garages.

Each computing device 10, 18 includes memory 22, 24, which stores appropriate instructions 26, 28, for performing the respective parts of the method, and a processor device 30, 32 in communication with the memory for executing the instructions. Input/output devices 34, 36, 38, 40 allow the computers to communicate with external devices. Hardware components 22, 24, 30, 32, 34, 36, 38, 40 of the respective computers are communicatively connected by a respective bus 42, 44. Client device 10 may be linked to a user interface comprising a display device 46, such as an LCD screen or computer monitor, and a user input device 48, such as a keyboard, keypad, touchscreen, or the like.

The client computer 10 generates and shares a public key 50 with the server computer 16 and maintains a private (secret) key 52 which is not provided to the server. The public and private keys 50, 52 form an asymmetric key pair. The two parts of this key pair are mathematically linked. The public key is used to encrypt plaintext to form ciphertext, but cannot decrypt it, whereas the private key is used by the client device to decrypt ciphertext.

The exemplary client instructions 26 include a vector representation component 60, an encryption component 62, and a decryption component 64. Briefly, for each element (word) of the input (second) dataset X 12, the vector representation component 60 generates a matrix representation comprising a set of (row) vectors. In an encryption scheme which does not require vectors as input, this component may be omitted. The encryption component 62 encrypts the set of vectors formed for each element of the input (first) dataset 12 with the public key 50 to form an encrypted input dataset 66 in which each vector of each element of the input dataset 12 is separately encrypted. The decryption component 64 decrypts encrypted data (obfuscated vectors) 68 received from the server computer 18, after the server has performed a fuzzy matching operation. Optionally, an output component 69 outputs the encrypted vectors 66 to the server and compares the decrypted obfuscated vectors 68 generated by decryption component 64 to determine whether there is a match with any of the client's words.

The exemplary server instructions 28 include a vector representation component 70, an encryption component 72, a matching component 74, and an obfuscation component 76. Briefly, for each element of the stored dataset Y, the vector representation component 70 generates a matrix which serves as a set of vector representations, using the same process as performed by the client vector representation component 60 (if used). The encryption component 72 encrypts the vector representations for each element of the stored dataset with the public key 50 to form an encrypted dataset 78, using the same process as performed by the client encryption component 62. The matching component 74 performs a fuzzy matching operation between the encrypted element(s) of the input dataset 66 and the encrypted elements of the database dataset 78, e.g., by computing a comparison measure, such as a distance, between pairs of encrypted elements. The obfuscation component 76 obfuscates the encrypted elements of the database dataset 14 to generate encrypted data 68 such that only those elements of the database dataset 14 which are t-fuzzy to elements of the client dataset 12 can be decrypted at the client device to form plaintext. The remaining elements of the database dataset are returned, when decrypted, in the form of random numbers, which are indecipherable by the client device. The client device outputs the plaintext elements, or information based thereon, as the result 80.

The computers 10, 18 may each be a desktop, laptop, palmtop, tablet computer, portable digital assistant (PDA), server computer, cellular telephone, pager, combination thereof, or other computing device capable of executing the instructions for performing the exemplary method.

The memory 22, 24 may each represent any type of non-transitory computer readable medium such as random access memory (RAM), read only memory (ROM), magnetic disk or tape, optical disk, flash memory, or holographic memory. In one embodiment, the memory 22, 24 comprises a combination of random access memory and read only memory. The network interface 36, 38 allows the computer to communicate with other devices via the computer network 20, and may comprise a modulator/demodulator (MODEM) a router, a cable, and and/or Ethernet port.

The digital processors 30, 32 can be variously embodied, such as by a single-core processor, a dual-core processor (or more generally by a multiple-core processor), a digital processor and cooperating math coprocessor, a digital controller, or the like. Each digital processor 30, 32 in addition to controlling the operation of the respective computer 10, 18 executes instructions stored in respective memory 22, 24 for performing the method outlined in FIG. 2.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As will be appreciated, FIG. 1 is a high level functional block diagram of only a portion of the components which are incorporated into a computer system 10, 18. Since the configuration and operation of programmable computers are well known, they will not be described further.

Formal FPM Definition

Fuzzy Private Matching (FPM) is a two-party protocol involving a client C and a server S (e.g., as illustrated by devices 10 and 18 in FIG. 1) that are each holding a set of elements, X and Y, of size (number of elements) m and n, respectively. Each element in the set is a fixed size word composed of T characters drawn from an alphabet A of D characters, D being from the set of non-zero natural numbers $\mathbb{N}$. Let the alphabet A be a finite set of characters, and having a cardinality D:

$$A = \{1, \ldots, D\}; |A| = D$$

Let W be the set of all words (elements) defined on the alphabet A, of size T characters:

$$W = \{l_i : i \in [1 \ldots T], l_i \in A\}$$

The client's and server's sets of elements X and Y can then be defined as:

$$X = \{X_i : i \in [1 \ldots m], X_i \in W\}$$

$$Y = \{Y_i : i \in [1 \ldots n], Y_i \in W\}$$

i.e., each set of elements, X and Y includes a set of one or more words drawn from the same set of words W. The client wants to privately find the 'intersection' of the two sets X and Y. This entails building a set formed of the words that can be found in the server's set which each match at least one of the client's words. Being a member of such intersection is resolved by computing the t-fuzziness between words. This allows a match between words when there is not a complete match between characters. The t-fuzziness between two words, $X_w \approx_t Y_{w'}$, meaning that the client's word $X_w = \{x_1 \ldots x_T\}$ is t-fuzzy to the server's word $Y_{w'} = \{y_1 \ldots y_T\}$, is defined as:

$$X_w \approx_t Y_{w'} \Leftrightarrow |X_w \cap Y_w| \geq t \Leftrightarrow |\{i : x_i = y_i, i \in [0 \ldots T]\}| \geq t$$

i.e., an element $X_w$ in X is fuzzy-matched with an element $Y_{w'}$ in Y if the intersection (number of matching characters, taking their respective positions into account) between element $X_w$ and element $Y_{w'}$ is equal to or greater than the threshold t. The threshold has a value which is less than the number of characters in each word, i.e., t<T.

For example, the words CAB and CAR may be considered a t-fuzzy match when the threshold t is 2, since the characters in the first position of the word match and the characters in the second position of the word match, so the number of characters found in the intersection between the two words (CA) is 2.

Finding the solution to the FPM problem between sets X and Y, for a given threshold t, is then defined as building a protocol which is able to find the following set of words:

$$FPM(X, Y, t) = \{Y_i \in Y | \exists X_i \in X : X_i \approx_t Y_i\},$$

i.e., the set of elements in Y for which there is at least one element $X_i$ in X for which the element $X_i$ is a fuzzy match with the element $Y_i$, given a predefined threshold t, with the following privacy constraints:

1. The server S is not able to discover any element of X, and

2. The client C is not able to discover any element of Y∉FPM(X,Y,t), i.e., cannot discover any element in the server's set that is not fuzzy matched with an element in the client's set.

As an example, in the license plate matching example discussed above, the client 10 has a license plate number consisting of a sequence of characters drawn from a finite alphabet A, such as the set of all letters and numbers (some of these characters maybe omitted from the set to ease recognition, such as O and/or 0). To convert this sequence to a fixed length element, the client may add filler characters, e.g., characters which are not part of the normal character set used in license plates. For example, when the fixed length is eight characters, the sequence "CAB 123" may be converted to a sequence 00CAB123, where spaces are ignored and where 0 is a filler character which forms a part of the alphabet A. The server 18 performs a similar process with the set of stored license plates 14 in the database, so that all elements (license plate numbers) have the same number of characters.

Adversary Models

The adversary model considered for the FPM problem is a semi-honest environment with a computationally bounded adversary, meaning that:

1. The parties do not deviate from the defined protocol but can use any additional information provided by the latter to attempt to discover more than intended by the original design.

2. There is a negligible probability, relative to a chosen security parameter k, that the encryption system is breakable by an attacker.

Homomorphic Encryption Scheme

The exemplary encryption components 62, 72 and method use a fully homomorphic encryption scheme which provides both addition and multiplication as homomorphic operations. When working with vectors, a third homomorphic operation may be provided, such as rotation.

The BGV encryption scheme is used in the exemplary FPM protocol to provide privacy, however, other FHE schemes which provide the homomorphic operators described herein may be used for encryption. BGV is defined over polynomial rings of the form:

$$\mathbb{A} = \mathbb{Z}_{[x]}/\Phi_p(x) \quad (1)$$

where each $\mathbb{Z}$ is an integer, p is a selectable parameter and $\Phi_p(x)$ is the p'th cyclotomic polynomial. The ring $\mathbb{A}_2$ corresponds to the binary polynomials of the plaintext space, with ciphertext being defined over a chain of moduli of decreasing size. See, Halevi 2013 for further details on an example implementation of BGV encryption. In one embodiment, $\Phi_p(x)$ is chosen such that it is large enough to keep information through the different operations, meaning a modulo large enough to keep every number computed under this upper limit.

In BGV, the basic element is a set of points represented as a vector (a single integer is not represented in this scheme, but a vector of size one containing a single integer is possible). An element (word) can then be represented as a vector, or more generally, as a set of them, depending of the parameters chosen for the cryptosystem. Each character is then represented by an integer, as for any encoding scheme.

In the following, $\{a\}_K$ represents an encrypted vector $\{a_0, \ldots, a_n\}_K$, K being the public key 50 used for encryption. The public key 50 and the private key 52, denoted sk, can thus both be defined over a polynomial ring, as in the BGV system or a variant thereof. See, for example, U.S. Pub. No. 20130216044, incorporated herein by reference.

Some of the operations allowed by the BGV cryptosystem over encrypted data which are useful herein are shown in TABLE 2.

TABLE 2

Example BGV homomorphic operations

| BGV vector operation | Example |
| --- | --- |
| Addition | $\{a + b\}_K = \{a\}_K + \{b\}_K$ |
| Multiplication | $\{a * b\}_K = \{a\}_K * \{b\}_K$ |
| Right shift (optional) | $shf(a, i)_K = \{(0, 0, a_0, \ldots, a_{T-i})\}_K$ |
| Right rotation | $rot(a, i)_K = \{(a_{1-i}, a_{2-i}, \ldots, a_{T-i})\}_K$ |

The addition operation allows the sum of 2+3 to be 5, irrespective of whether the addition is performed before or after encryption.

Right shift shifts the right character of the data element, for example when the data element is represented as a binary number, the right bit of the number is discarded. The number 4 is represented as 100 in binary, a right shift gives 010, corresponding to 2.

Right rotation shifts the right-most character to the left-most position.

Compact Fuzzy Private Matching Using Fully Homomorphic Encryption

Algorithm 1 briefly describes the CFPM-FHE protocol, which is described in greater detail below and illustrated in FIG. 2, where client-side operations are shown on the left and server-side operations on the right.

Algorithm 1

Input: The client has a dataset X = $\{X_1,...,X_m\}$, the server has a dataset Y = $\{Y_1,...,Y_n\}$ where $X_i = (x_{i1},...,x_{iT}) \in D^T$ and $Y_j = (y_{j1},...,y_{jT}) \in D^T$.
Output: The client learns $X \cap_t Y$.
1. Setup
  (a) The client prepares sk the secret key, K the public key, and the other parameters for the fully homomorphic cryptosystem and sends K and the parameters to the server.
  (b) Data encryption: The client and the server represent their data elements as word-matrix-representations. Then, they encrypt their respective set of representations using the same key K.
  (c) The server encrypts a set of unitary vectors, such as: $\{(0,...,0)\}_K$, ..., $\{(T,...,T)\}_K$.
  (d) The client sends its encrypted set $\{X\}_K$ to the server.
2. Phase 1 The server, $\forall i \in [m], \forall j \in [n]$:
  (a) computes $\{H_j^i\}_K = \{\Sigma_{\delta=1}^D r_j^\delta r_j^\delta\}_K$.
  (b) computes $\{\Delta_H (X_i, Y_j)\}_K = \{T\}_K - \{\Sigma_{w=1}^T rot(H_j^i, w)\}_K$.
3. Phase 2 The server,
  (a) $\forall j \in [n]$, computes $\{\Pi_{i=1}^m \Pi_{w=0}^{t-1} (\Delta_H(X_i,Y_j) - w).r\}_K + \{Y_j\}_K$ where r is a random vector.
  (b) sends these n vectors to the client.
4. Final phase The client,
  (a) initializes output set S to empty.
  (b) $\forall j \in [n]$, decrypts the vector received with secret key sk and:
    i. if all letters of $Y_j$ are in D and $\exists i \in m$ such that $X_i \approx_t Y_j$, adds $(X_i, Y_j)$ in S.
    ii. otherwise, concludes that $\forall i \in [m], X_i \not\approx_t Y_j$
  (c) returns $S = X \cap_t Y$.

FIG. 2 illustrates this procedure. The method begins at S100.

Setup

The client 10 has a pair of public and secret keys 50, 52 (K, sk). The client prepares the parameters for the fully homomorphic cryptosystem and sends K and the parameters to the server (S102). The parameters sent may depend on the type of encryption being used. For example, they may include parameter p in Eqn. 1. At S104, the server 18 receives this information. If the public key and parameters have already been sent to the server, e.g., for a prior database search, these steps may be omitted.

At S106, the client 10 receives an input dataset 12, which is represented in the form of a set X of one or more data elements (words). The dataset X includes at least one word and in some embodiments, more than one word, such as up to ten words, or more. Similarly, at S108, the server 18 retrieves a stored dataset Y (including one or more data elements to be compared with X). The dataset Y includes at least one word and in some embodiments, more than one word, such as at least 5 words, or at least 10 words, or up to 100 words, or at least 100 words, or up to 1000 words, or more. In some embodiments, the number of words in dataset Y is at least 5 times, or at least 10 times, or at least 100 times the number of words in dataset X.

To preserve each word's privacy, the vector representation of the word (i.e., its sequence of characters) is transformed to a matrix representation, which includes a vector, which can be a row (or column) of the matrix, for each character of the alphabet A. Each vector in the matrix includes a set of vector elements, one vector element for each character in the vector representation of the word. Thus, for example where the words are 6 characters in length and there are 24 characters in the alphabet, a 6×24 matrix is generated. The vectors are generated by the vector representation component 60, 70 using a word-matrix-representation function which compares each character of the word vector with each character of the alphabet (S110, S112). This may be performed as follows:

For a given word $X_i$ in X (and respectively each word $Y_j$ in Y), where each word $X_i$ includes a sequence of characters: $X_i = (x_1 \ x_2 \ \ldots \ x_T)$, which is treated as a vector, the word's matrix representation $R(X_i)$ of $X_i$, denoted $R_i$ is defined as:

$$R_i = \{r_i^\delta\}_{\delta in [1 \ldots D]} = \begin{pmatrix} r_i^1 \\ r_i^2 \\ \vdots \\ r_i^D \end{pmatrix} = \begin{pmatrix} \rho_{1,1} & \rho_{1,2} & \cdots & \rho_{1,T} \\ \rho_{2,1} & \rho_{2,2} & \cdots & \rho_{2,T} \\ \vdots & \vdots & \ddots & \vdots \\ \rho_{D,1} & \rho_{D,2} & \cdots & \rho_{D,T} \end{pmatrix}$$

with $\rho$ being the function transforming each character of $X_i$:

$$\rho(a,b) = \begin{cases} 1 & \text{if } a = b \\ 0 & \text{if } a \neq b \end{cases}$$

where a represents the character at position a in alphabet A and b represents the character at position b in the word. Each row of the matrix has T vector elements, one for each character of the word, and each column had D elements corresponding to the D characters in the alphabet. The matrix could, of course, be arranged such that the rows are represented as columns.

Thus, for example, $\rho_{1,2}$ compares the first character of the alphabet with the second character $x_2$ of the word and if they are the same, outputs a 1, otherwise 0. Each of the columns in the matrix thus has a 1 at no more than one position in the column, where the character of the word matches the position in the alphabet, and all the other positions are 0. The row vectors can have a 0 at each position, however at least some of the row vectors include a 1 at one or more positions. Each of the row vectors is thus a binary vector with each vector element being one of two binary values.

At S114, the client encryption component 62 encrypts each row vector of the matrix with the public K of the fully homomorphic encryption scheme, using the provided parameters, to form a set of encrypted row vectors. The encrypted matrix representation of the word $X_i$ (and analogously for $Y_j$) is then a vector of encrypted row vectors denoted $\{R_i\}_K$, as follows:

$$\{R_i\}_K = \begin{pmatrix} (\rho_{1,1} & \rho_{1,2} & \cdots & \rho_{1,T})_K \\ (\rho_{2,1} & \rho_{2,2} & \cdots & \rho_{2,T})_K \\ \vdots & \vdots & \ddots & \vdots \\ (\rho_{D,1} & \rho_{D,2} & \cdots & \rho_{D,T})_K \end{pmatrix}$$

The client's set of row vectors are denoted as R and the elements of the vectors are denoted $\rho$. The server's representation and elements are denoted as R' and $\rho'$, respectively.

As an example of steps S110 and S114, the word "cab" on the alphabet (a,b,c,d) is represented by the following matrix:

$$X_1 = \text{"cab"} = \begin{pmatrix} (0 & 1 & 0) \\ (0 & 0 & 1) \\ (1 & 0 & 0) \\ (0 & 0 & 0) \end{pmatrix}$$

And the encryption of the word is represented by the following set of encrypted row vectors:

$$\{X_1\}_K = \{\text{"cab"}\}_K = \begin{pmatrix} (0 & 1 & 0)_K \\ (0 & 0 & 1)_K \\ (1 & 0 & 0)_K \\ (0 & 0 & 0)_K \end{pmatrix}$$

Each word of the client's dataset X is thus encrypted in this way using the public key K of the same fully homomorphic encryption scheme, using the same encryption parameters. At S116, the client sends the encrypted set of vectors for each word to the server. As will be appreciated other encryption may be used for sending the data, in addition to that described herein, although it is not generally needed.

The server encrypts his set of data elements in the same way (S118). The server also encrypts a set of unitary vectors, such as T+1 unitary vectors from 0 . . . T, using K (S120). The set of encrypted unitary vectors is used later in the algorithm. The encrypted unitary vectors are of the form $\{(0,0,0,\ldots)\}_K$, $\{(1,1,1,\ldots)\}_K$, etc., i.e., the same number in each position of the vector. However, not all these encrypted vectors from 0 . . . T are generally needed. In one embodiment, where only the unitary vectors from 0 . . . (T−t) and T are used in the method, only a set of (T−t)+2 unitary vectors actually needs to be encrypted. In another embodiment, where only the unitary vectors from t . . . T are used, only (T−t)+1 unitary vectors need to be encrypted.

The client's encrypted data 66 (sets of encrypted row vectors) is received by the server 18 and temporarily stored in memory (S122). The server is not able to decrypt the set(s) of encrypted row vectors as the private key 52 is not provided to the server.

First Phase: Computing Hamming Distance

The matching component 74 of the server computes a comparison measure between pairs of the elements-one from the server and one from the client, e.g., a distance (or similarity) between the encrypted vectors for one of the server's elements and the encrypted vectors for one of the client's elements (S124). In one embodiment, the comparison measure is the Hamming distance. The Hamming distance between two vectors of equal length is the number of positions at which the corresponding symbols are different. In this step, the server computes the nm Hamming distance vectors $\Delta_H(X_i,Y_j)$, but does so in encrypted form, i.e., as $\{\Delta_H(X_i,Y_j)\}_K$.

First the server computes an encrypted similarity vector $\{H_i^j\}_K$ (corresponding to the inverse Hamming distance), which identifies similar elements:

$$\forall i \in [1 \ldots m], \forall j \in [1 \ldots n], \{H_i^j\}_K = \{\Sigma_{\delta=1}^{D} r_i^\delta r_j'^\delta\}_K \quad (2)$$

i.e., for each $i \in [0 \ldots m]$ and for each $j \in [0 \ldots n]$, the corresponding row vectors $r_i^\delta$ and $r_j'^\delta$ of two words being compared are multiplied together and then the sum of the results is computed over all the D rows. In multiplying two vectors, each element of one vector is multiplied by the element at the same position in the other. If in $X_i$ and $Y_j$, the k-th letter is the same, then the result of the multiplication will contain a 1 at the position k, otherwise, it will be 0. Thus, for example, when the vectors $\{(0,1,0)\}_K$ and $\{(0,1,0)\}_K$ are multiplied, the result is $\{(0,1,0)\}_K$ and when the vectors $\{(0,0,1)\}_K$ and $\{(0,1,0)\}_K$ are multiplied, the result is $\{(0,0,0)\}_K$. This multiplication is performed on the encrypted vectors, since the encryption scheme is one which permits the multiplication operation to generate the same result as when the operation is performed on the unencrypted vectors. The sum of all of the multiplied vectors gives a single encrypted vector containing 0's and 1's. The number of 1's in the similarity vector $\{H_i^j\}_K$ corresponds to the number of identical letters in the two words.

To obtain the Hamming distance, the aim is to sum all the elements of the vector $H_i^j$ and subtract this from the number of characters T in each element. Since the similarity measures $\{H_i^j\}_K$ are in the form of a vector, however, the sum can be readily performed by rotating the encrypted vector (using the rotation operator of the cryptosystem), and summing each rotated vector with the initial vector. This step can be performed according to Eqn. (3):

$$\{\Delta_H(X_i,Y_j)\}_K = \{T\}_K - \{\Sigma_{w=1}^{T} rot(H_i^j,w)\}_K \quad (3)$$

Specifically, each rotation causes the last element of a vector to be repositioned in the first position, shifting all the other elements of the vector one position to the right. By doing so T times, a vector is obtained whose elements are all the same: the number of identical letters in the two words. Thus, for example, the encrypted vector $\{H_i^j\}_K = \{(0,1,0)\}_K$ becomes $\{(0,0,1)\}_K$ in a first rotation and $\{(1,0,0)\}_K$ in a second rotation. Adding these to the initial vector gives $\{\Sigma_{w=1}^{T} rot(H_i^j,w)\}_K = \{(0,1,0)\}_K + \{(0,0,1)\}_K + \{(1,0,0)\}_K = \{(1,1,1)\}_K$. The final operation is to subtract this vector from an encrypted representation of T, $\{T\}_K$, which is an encrypted unitary vector (precomputed at step S118) in which all elements have the value T, the length of each word. For example, when T=3, $\{T\}_K = \{(3,3,3)\}_K$. An encrypted Hamming distance vector $\{\Delta_H(X_i,Y_j)\}_K$, in which each element of the vector $\Delta_H(X_i,Y_j)$ corresponds to the number of non-matching characters is thus obtained. E.g., $\{\Delta_H(X_i,Y_j)\}_K = \{(3,3,3)\}_K - \{(1,1,1)\}_K = \{(2,2,2)\}_K$, i.e., two non-matching characters, in the above example.

In another embodiment, rather than the Hamming distance, corresponding to the number of elements of the vector which are different, the inverse Hamming distance (number of similar elements) can be used, as described below.

The computation of the encrypted Hamming distance $\{\Delta_H(X_i,Y_j)\}_K$ is performed for every possible pair of encrypted data elements (one from the server set, the other from the client set).

Second Phase: Sending the Vectors to the Client-oblivious Transfer

Then, at S126, the Hamming distance vectors are used to obfuscate the Y set. In particular, using the Hamming distance vectors between pairs of elements computed at S124, the obfuscation component 76 of the server computes a set of n obfuscated vectors, one for each word in Y, of the form:

$$\forall j \in n, \{\Pi_{i=1}^{m} \Pi_{w=0}^{T-t} (\Delta_H(X_i,Y_j)-w)\cdot r\}_K + \{Y_j\}_K \quad (4)$$

i.e., computes for each value of j, an encrypted product of every value of $(\Delta_H(X_i,Y_j)-w)\cdot r$, where $\Delta_H(X_i,Y_j)$ is the Hamming distance vector computed as described above (in encrypted form), each w is an (encrypted) unitary vector from 0 up to T−t (i.e., (0,0,0 ... ), (1,1,1, ... ), where T is the number of characters in each word, t is the threshold, and r is a random vector. r can be generated by a random vector generator and thus is different each time the algorithm is run and for each value of n and m and w. This first term is then added to an encrypted vector $\{Y_j\}_K$, where Y is used in the classic representation ($y_1, \ldots, y_T$).

The first term of Eqn. 4 will be null if and only if at least one of the client's data elements $X_i$ is $\approx_t$ to $Y_j$. i.e., there is at least one word in X whose Hamming distance vector to the nth word in Y corresponds to one of the unitary vectors w, giving a vector of 0's to be multiplied by r, which gives a zero vector (see proof below). The result of the product in Eqn. 4 is then $\{Y_j\}_K$ only if this is true. However, the server does not distinguish between the n resulting obfuscated vectors, since it is unable to decrypt them. The server simply sends all of the n obfuscated vectors 68 to the client (S128). At S130, the set of obfuscated vectors is received at the client.

Final Phase: Decryption and Verification

At S132, the client decrypts the n obfuscated vectors 68 with the description component and compares them to the input dataset (S134). If any plaintext in $A^T$ is t-fuzzy to any word from X, the decryption component adds this plaintext to the output set. A decrypted obfuscated vector will only correspond to plaintext if the obfuscated vector computed according to Eqn. 4 corresponds to $\{Y_j\}_K$. Otherwise, $Y_j$ is added to a lengthy random vector and is indecipherable.

It can be readily shown that the client obtains what he is supposed to, given the output of Eqn. 3, as follows:

For all $j \in [1 \ldots n]$, two cases can be distinguished:

$$\exists i \in [1 \ldots m], X_i \approx_t Y_j \quad 1)$$

i.e., for at least one i, the client's word $X_i$ is t-fuzzy with the stored word $Y_j$.

$$\forall i [1 \ldots m], X_i \not\approx_t Y_j \quad 2)$$

i.e., for all i, the client's word $X_i$ is not t-fuzzy with the stored word $Y_j$, i.e., there is no fuzzy match between any of the client's words and the n'th word of the server's dataset.

Case 1):

$$\exists i \in [1 \ldots m], X_i \approx_t Y_j \Leftrightarrow \exists i \in [1 \ldots m], \Delta_H(X_i,Y_j) \in [0 \ldots (T-t)]$$

$\Leftrightarrow \exists i \in [1 \ldots m], \{\Pi_{w=0}^{T-t}(\Delta_H(X_i,Y_j)-w)\}_K = \{0\}_K$ $\Leftrightarrow \{\Pi_{i=1}^{m}\Pi_{w=0}^{T-t}(\Delta_H(X_i,Y_j)-w)\}_K = \{0\}_K$ $\Leftrightarrow \{\Pi_{i=1}^{m}\Pi_{w=0}^{T-t}(\Delta_H(X_i,Y_j)-w)\cdot r\}_K + \{Y_j\}_K = \{Y_j\}_K$ The client then receives the obfuscated vector $\{Y_j\}_K$, decrypts it, and adds the result to the output as it is t-fuzzy with one of the client's word vectors.

Case 2):

The client receives the obfuscated vector: $\{\Pi_{i=1}^{m}\Pi_{w=0}^{T-t}(\Delta_H(X_i,Y_j)-w)\cdot rnd\}_K + \{Y_j\}_K$, where rnd is a random vector formed by multiplying the random vectors r. As the double product is not the null vector, the client decrypts what appears to be a large random vector, from which $Y_j$ cannot be decrypted. The probability that a random rnd will produce a correct t-fuzzy element in $A^T$ is negligible. Therefore, the probability of a false positive is negligible. This vector is therefore not added to the output 80.

The client can do a simple check by comparing the Hamming distance on the decrypted obfuscated vector with each word of the client dataset. For example, if the input dataset corresponds to 'cab' and one of the decrypted vectors is 'car' a t-fuzzy match is found when t=1. The client could use a different value of t than used on the server side, although in the exemplary embodiment, the same value is used.

At S136, the client device outputs the result of the fuzzy matching or information based thereon. For example, the client device may return the set of $X_i$ that are fuzzy-matched. In another embodiment, if a fuzzy match is found, as in the license plate example, the client may simply output a positive value to indicate a match has been found, otherwise a negative value. In other embodiments, the result is used to implement a process, such as providing access to a parking garage, billing the person associated with the license plate, or the like in the case of the license plate example, or providing access in the case of a biometric scan.

The method ends at S138.

An example implementation of the algorithm is now shown for illustration.

Example for T=3, D=4, m=2 and n=3

An example of the use of the algorithm is given, by way of example. Let the number of characters in each word T=3, the number of letters in the alphabet D=4 (the letters being a,b,c,d), the number of words in the client's set m=2, and the number of words in the server's set n=3. Let X=('cab','abc') and Y=('cad','ddd','acb'). Let the fuzziness threshold t=2, i.e., no more than 1 character of a word can be different for a match to be found. The output should then be $X \cap_{t=1} Y$=('cad'). Following the algorithm, the data is represented as follows:

$$X_1 = 'cab' = \begin{pmatrix} 0 & 1 & 0 \\ 0 & 0 & 1 \\ 1 & 0 & 0 \\ 0 & 0 & 0 \end{pmatrix}, X_2 = 'abc' = \begin{pmatrix} 1 & 0 & 0 \\ 0 & 1 & 0 \\ 0 & 0 & 1 \\ 0 & 0 & 0 \end{pmatrix}$$

$$Y_1 = 'cad' = \begin{pmatrix} 0 & 1 & 0 \\ 0 & 0 & 0 \\ 1 & 0 & 0 \\ 0 & 0 & 1 \end{pmatrix}, Y_2 = 'ddd' = \begin{pmatrix} 0 & 0 & 0 \\ 0 & 0 & 0 \\ 0 & 0 & 0 \\ 1 & 1 & 1 \end{pmatrix}$$

$$Y_3 = 'acb' = \begin{pmatrix} 1 & 0 & 0 \\ 0 & 0 & 1 \\ 0 & 1 & 0 \\ 0 & 0 & 0 \end{pmatrix}$$

The client encrypts then sends $\{X_1\}_K, \{X_2\}_K$, and K to the server. The server computes $\{Y_1\}_K, \{Y_2\}_K, \{Y_3\}_K$. Then the server computes the Hamming distance between all vectors. As an example, for $\{X_1\}_K$ and $\{Y_1\}_K$:

$\{H_1^1\}_K = \{\Sigma_{\delta=1}^{4} r_i^{\delta} r_1'^{\delta}\}_K$ $\{H_1^1\}_K = \{(0,1,0)\}_{K'}\{(0,1,0)\}_K + \{(0,0,1)\}_{K'}\{(0,0,0)\}_K + \{(1,0,0)\}_{K'}\{(1,0,0)\}_K + \{(0,0,0)\}_{K'}\{(0,0,1)\}_K$ $\{H_1^1\}_K = \{(0,1,0)\}_K + \{(0,0,0)\}_K + \{(1,0,0)\}_K + \{(0,0,0)\}_K$ $\{H_1^1\}_K = \{(1,1,0)\}_K$ Then in the first phase:

$\{\Delta_H(X_1,Y_1)\}_K = \{3\}_K - \{\Sigma_{w=1}^{3} rot(H_1^1,w)\}_K$ $\{\Delta_H(X_1,Y_1)\}_K = \{(3,3,3)\}_K - \{\Sigma_{w=1}^{3-1} rot((1,1,0),w)\}_K$ $\{\Delta_H(X_1,Y_1)\}_K = \{(3,3,3)\}_K - \{(2,2,2)\}_K$ $\{\Delta_H(X_1,Y_1)\}_K = \{(1,1,1)\}_K$ Result:

$\{\Delta_H(X_1,Y_1)\}_K = \{(1,1,1)\}_K$ $\{\Delta_H(X_1,Y_2)\}_K = \{(3,3,3)\}_K$ $\{\Delta_H(X_1,Y_3)\}_K = \{(2,2,2)\}_K$ $\{\Delta_H(X_2,Y_1)\}_K = \{(3,3,3)\}_K$ $\{\Delta_H(X_2,Y_2)\}_K = \{(3,3,3)\}_K$ $\{\Delta_H(X_2,Y_3)\}_K = \{(2,2,2)\}_K$ Thus, $X_1,Y_1$ is a fuzzy match since the Hamming distance is 1.

In the second phase, Eqn. 4 is computed for all the results. For the second part of the product, T−t=1, so w uses unitary vectors for 0 and 1.

Example for $Y_1$. The server returns:

$$\left\{\prod_{i=1}^{2}\prod_{w=0}^{1}(\Delta_H(X_i, Y_1)-w)\cdot r\right\}_K + \{Y_1\}_K = $$

$$\left\{\prod_{i=1}^{2}((\Delta_H(X_i, Y_1)-(0,0,0))(\Delta_H X_i, Y_1)-(1,1,1))\cdot r\right\}_K + \{(3,1,4)\}_K$$

Note that for $Y_2$ and $Y_3$, the random vector will not be canceled. The server will send the following vectors: $\{(3,1,4)\}_K, \{(r_1,r_2,r_3)\}_K, \{(r_4,r_5,r_6)\}_K$, where $r_1,r_2,r_3$, etc. are elements of the resulting random vectors.

The client receives these encrypted vectors and decrypts them. The decrypted vectors are checked against the plain text of the client's set if the plaintexts are t-fuzzy. Only the first vector will be kept in the output: (3,1,4)=('cad'). As will be appreciated, if the decrypted vector is a long random string, the client does not need to perform a comparison, since only the short vectors are likely to be a match.

Complexity Analysis

The complexity of the algorithm can be determined as follows. For the communication and the computation complexities, only the dominant terms are kept.

1. Setup: (n+m)D encryptions, mD encrypted vectors transferred.
2. Phase 1: nm(2D+2T−3) operations.
3. Phase 2: n(m(2t−1)+2) operations, n encrypted vectors transferred.
4. Verification: n decryptions, then n*m operations.

When considering n=m (number of elements in each set), and t≈T complexities shown in TABLE 3 are obtained. $1_{pk}$ is the cyphertext size of a basic element with the chosen encryption scheme, t the fuzziness threshold, T the size of a word, and $T'_e$ the time needed for a combination of homomorphic operations. These complexities are compared with those for two existing protocols that are still considered secure.

TABLE 3

Complexities

| Protocol | Communication | Computation |
|---|---|---|
| FPM-CHM1 | $O(n^2 T l_{pk})$ | $O(n^2 (T_t \, poly(T) + TT'_e))$ |
| FPM-YE | $O(n^2 T^2 l_{pk})$ | $O(n^2 (poly(T) + T^2 T'_e))$ |
| CFPM-FHE (present) | $O(nDl_{pk})$ | $O(n^2 (D + T) T'_e)$ |

A non-formal definition of the O notation is used for facilitating the comparison. The present protocol is more efficient.

Optimizations

Some optimizations could be performed to reduce the complexity. As examples:

1) During the Hamming distance computing phase, the server only needs to multiply the d vector if d contains at least a '1'. The reason is that otherwise, the product will be null, and thus bring no information. If T<D (only few real cases will verify this property), then this reduces the complexity by a factor D/T. Otherwise, only a few multiplications will not be done, depending on how the alphabet is used to represent data.

2) During the second phase, the Hamming Distance is multiplied by all values between t and T. If t>T/2, an optimization would be to use the inverse of the Hamming distance (corresponding to the number of similar letters between the two words). Then in Eqn. 4, $\Pi_{w=t}^{T} (\Delta_H^{inv}(X_i, Y_j)-w)$ can be used, in place of $\Pi_{w=0}^{T-t} (\Delta_H(X_i, Y_j)-w)$, i.e., $$\{\Pi_{i=1}^{m} \Pi_{w=t}^{T} (\Delta_H^{inv}(X_i, Y_j) - w) \cdot r\}_K + \{Y_j\}_K \quad (5)$$

thus improving the complexity.

3) If, when choosing the parameters for encryption, when the field obtained has more than 2T parameters, then the size of data sent by the server can be reduced. Indeed, using multiplicative masks, more than one Y can be stored in each vector. For example, if the size of vectors being manipulated is 5T, 5 of the data can be stored in every vector. Then the communication complexity is reduced by 5 on the server's part.

Fully Homomorphic Encryption is known to have a few limitations: the size of the ciphertext and the time to compute operations. Methods exist that can improve both these parameters (see, Yin Hu, "Improving the Efficiency of Homomorphic Encryption Schemes," PhD thesis, Virginia Tech, 2013). Optimizations of the implementation could be achieved by using somewhat homomorphic encryption (SWHE) encryption schemes in which a limited number of operations are supported (e.g., evaluate circuits of a certain depth) (see, for example, Boneh, et al., "Private Database Queries Using Somewhat Homomorphic Encryption," ACNS 2013: 102-118 (2013)), or a LSH function for dimension reduction.

The method illustrated in FIG. 2 may be implemented in a computer program product that may be executed on a computer. The computer program product may comprise a non-transitory computer-readable recording medium on which a control program is recorded (stored), such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other non-transitory medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, Graphical card CPU (GPU), or PAL, or the like. In general, any device, capable of implementing a finite state machine that is in turn capable of implementing the flowchart shown in FIG. 2, can be used to implement the method. As will be appreciated, while the steps of the method may all be computer implemented, in some embodiments one or more of the steps may be at least partially performed manually.

Without intending to limit the scope of the exemplary embodiment, the following example illustrates a prototype implementation of the system.

EXAMPLE

A version of the CFPM-FHE protocol was implemented between a client and a server in a Linux environment. Client and server instructions are written in C++ and are deployed on two different machines having the same characteristics shown in TABLE 4.

TABLE 4

Server and Client characteristics

| Characteristic | Value |
|---|---|
| CPU | Intel(R) Xeon(R) CPU E3-1230 V2 @ 3.30 GHz |
| RAM | 32 Gb of memory |
| OS | CentOS release 6.5 (Final) |
| Compiler | g++ gcc version 4.4.7 20120313 (Red Hat 4.4.7-4) (GCC) |

The client's and the server's sets are stored in files, the communication is done using raw sockets, and the FHE library used is HElib (Shai Halevi, et al., "Helib" GPL source code published on GitHub https://github.com/shaih/HElib (2013). No optimization was done regarding the algorithms in this example or regarding the C++ core (use of multi-threaded elements, . . . ). The Helib scheme employs BGV, providing some optimizations to make homomorphic evaluation run faster, focusing mostly on effective use of the Smart-Vercauteren ciphertext packing techniques (Smart, et al., "Fully Homomorphic SIMD Operations," Cryptology ePrint Archive: Report 2011/133 (2011)) and the Gentry-Halevi-Smart optimizations (Gentry, et al., "Homomorphic Evaluation of the AES Circuit," Cryptology ePrint Archive: Report 2012/099 (2012)). Parameters used for the Helib algorithm were as follows: p=257, L=32, c=3, d=1, r=1, M=23377.

The main goal, besides checking the validity and correctness of the algorithm, was to validate experimentally the given complexities in terms of data space and computation.

TABLE 5 provides some metrics on encrypted data size using HELib, and a comparison with the RSA cryptosystem, using the same level of security (112 bits of security is given equivalent to AES 128-bits key, or RSA 2048-bits key).

TABLE 5

Impact of HE operations on data size

| Data type | Represents | Raw size | FHE | RSA |
|---|---|---|---|---|
| Key | One of the encryption keys | 0 | 16 MB | 2048 b |
| 378 elements | One basic vector (size of the ring) | 1.5 KB | 642 KB | 93 KB |
| 42,000 elements | Feature vector for image similarity | 168 KB | 77 MB | 11 MB |
| 1 million elements | Language model | 4 MB | 1.7 GB | 260 MB |

In TABLE 6, some metrics regarding the computing cost of HELib, from the key generation time to the decryption of the result of an homomorphic operation are shown:

TABLE 6

Time in ms for HE operations

| Operation | $2^{32}$ elements | $2^7$ elements |
|---|---|---|
| Key generation | 12,000 | 5500 |
| Encryption | 300 | 81 |
| Addition | 1.46 | 0.24 |
| Multiplication | 12 | 2.1 |
| Decryption | 190 | 36 |

Experimental Results

Figure 3:
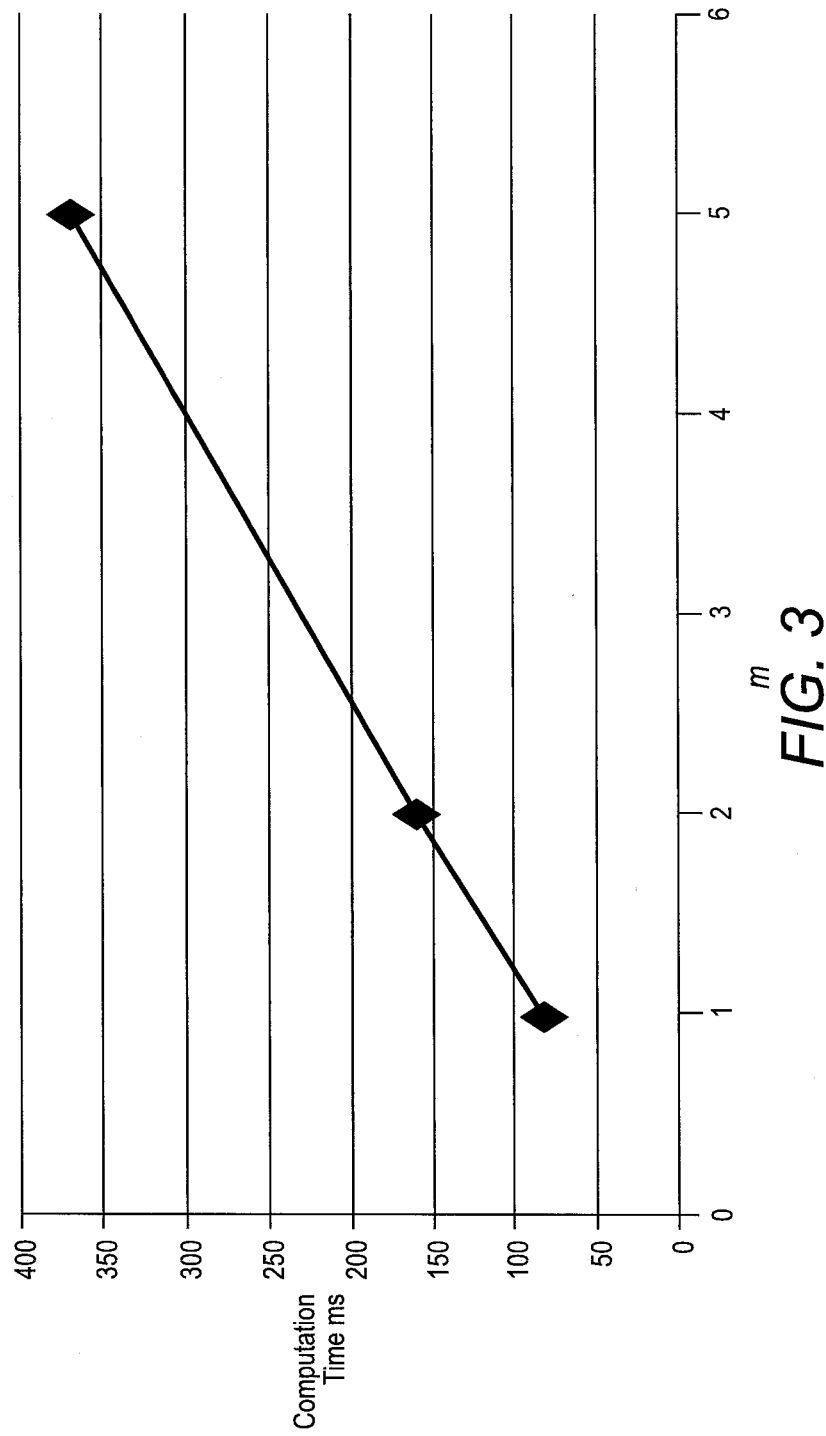
FIG. 3 is a graph illustrating computation time versus over m, the Client's set size, for a prototype system in accordance with the exemplary embodiment.
Figure 4:
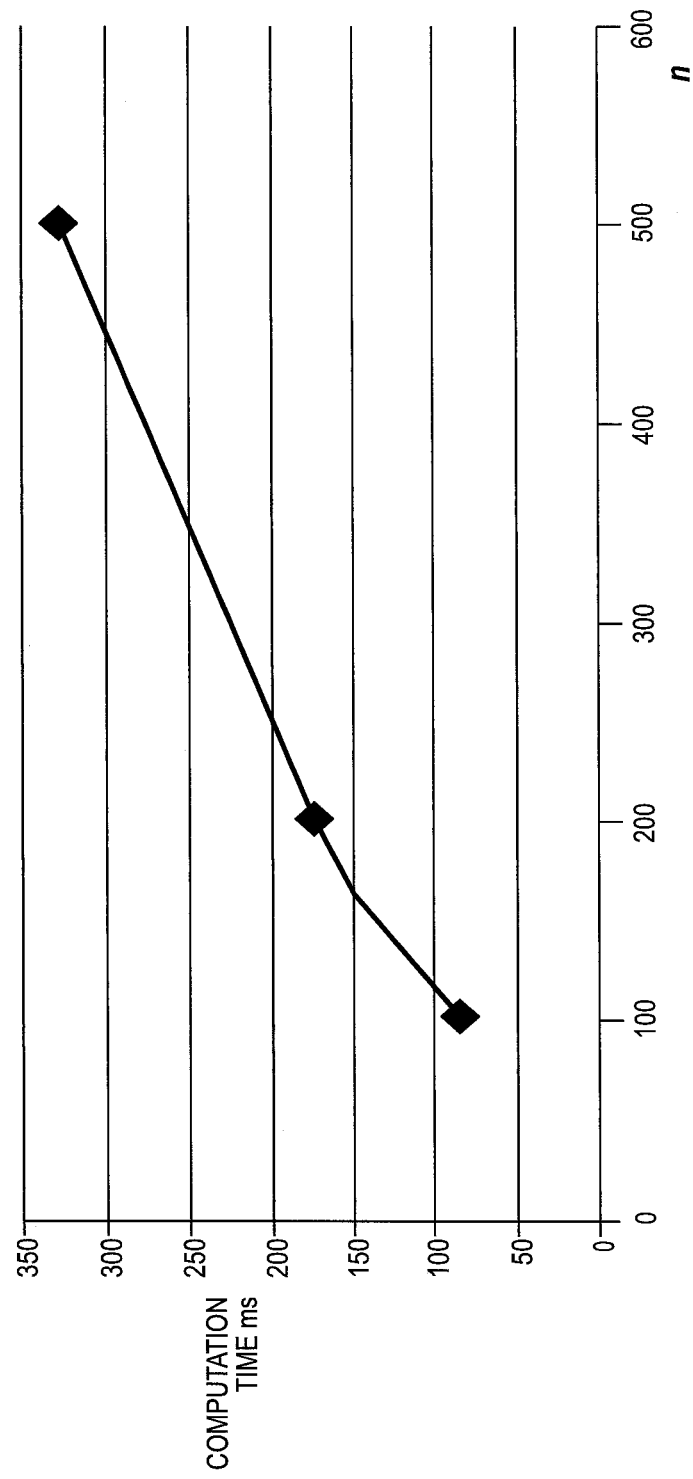
FIG. 4 is a graph illustrating computation time versus n, the Server's set size, for the prototype system.
Figure 5:
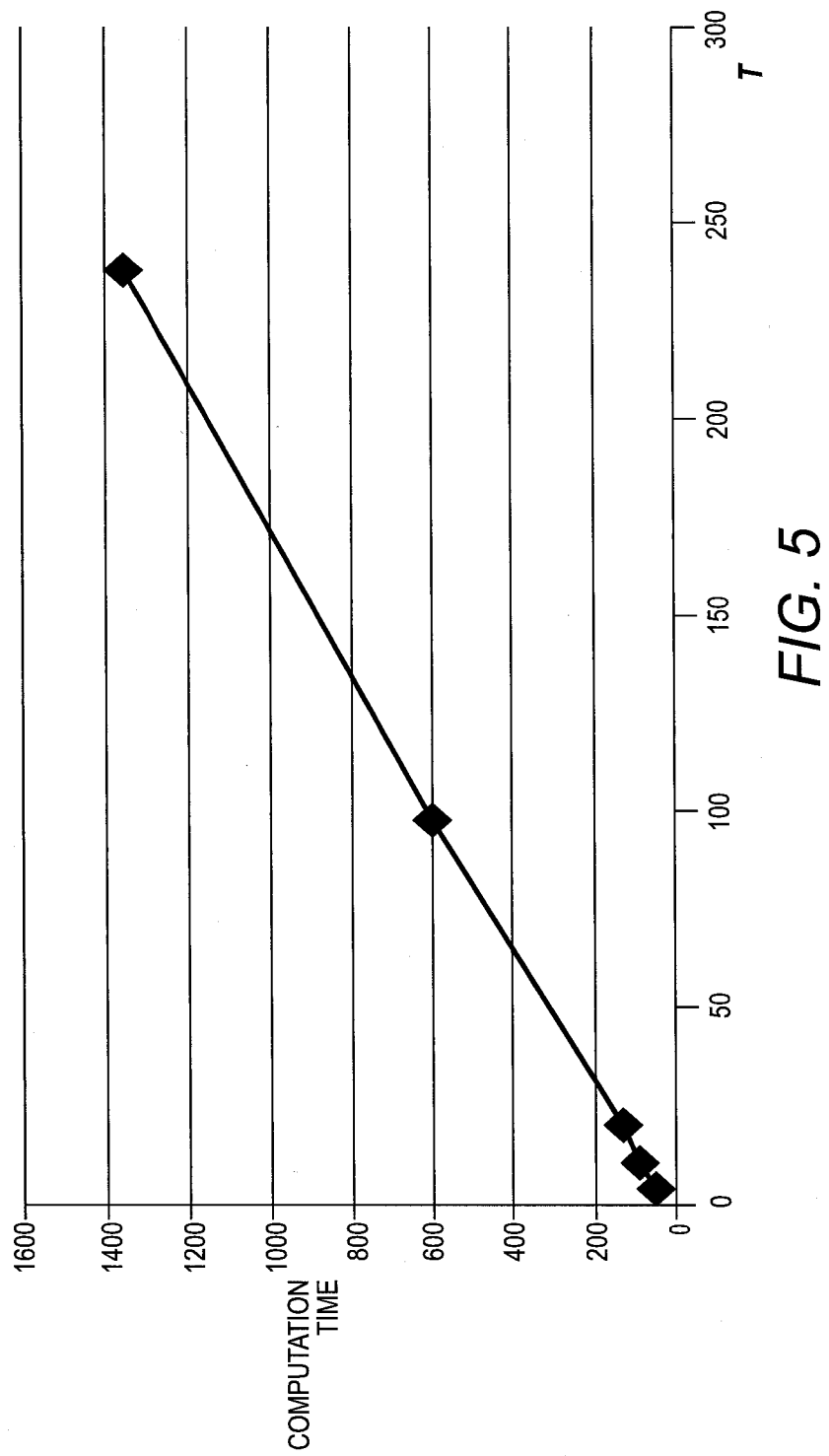
FIG. 5 is a graph illustrating computation time versus T, the Word size, for the prototype system.

The variation in the data size produced by the CFPM-FHE protocol is shown in FIGS. 3-5 (i.e., the communication cost in Gb when changing the values of m, n and T). FIG. 3 shows computation time over m, the Client's set size. FIG. 4 shows computation time over n, the Server's set size. FIG. 5 shows computation time over T, the Word size.

Figure 6:
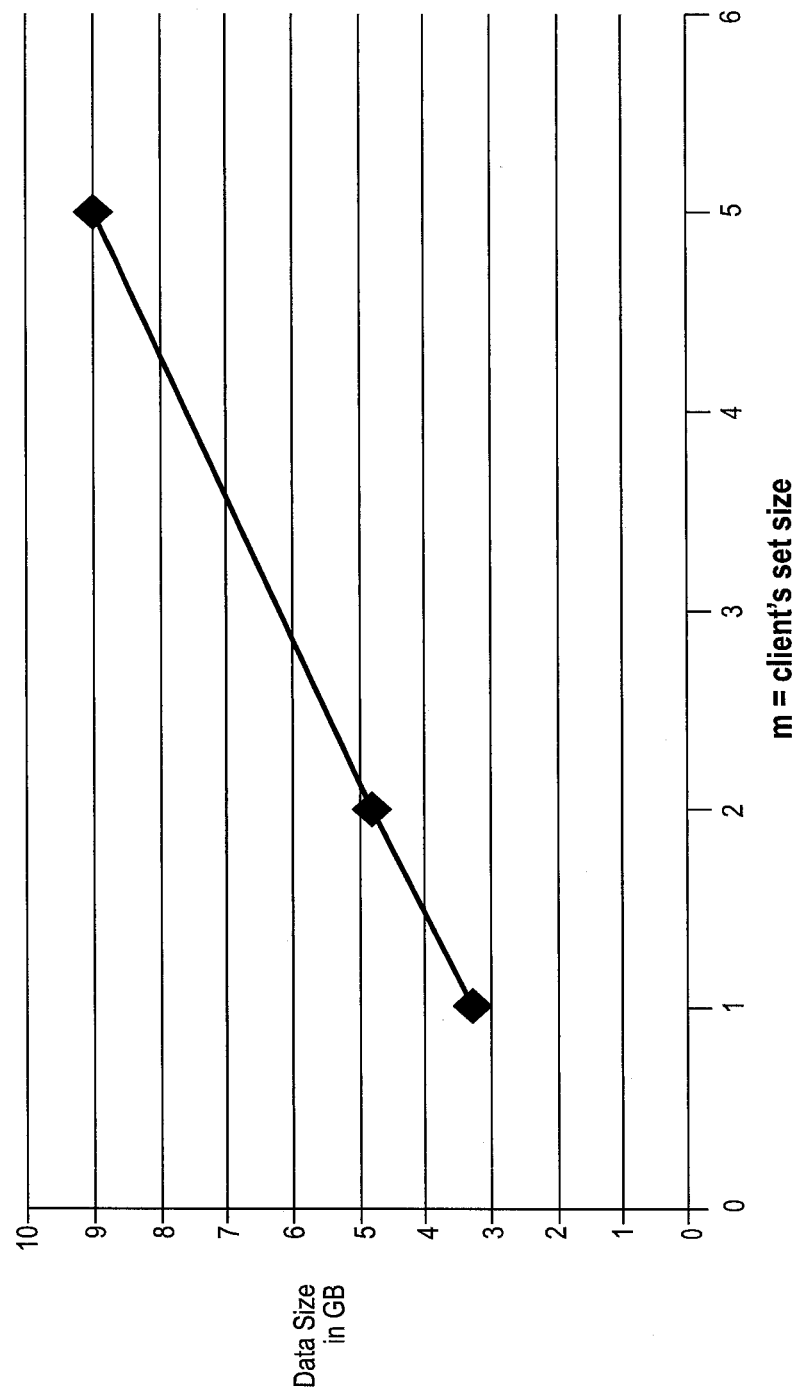
FIG. 6 is a graph illustrating computation cost versus m, the Client's set size, for the prototype system.
Figure 7:
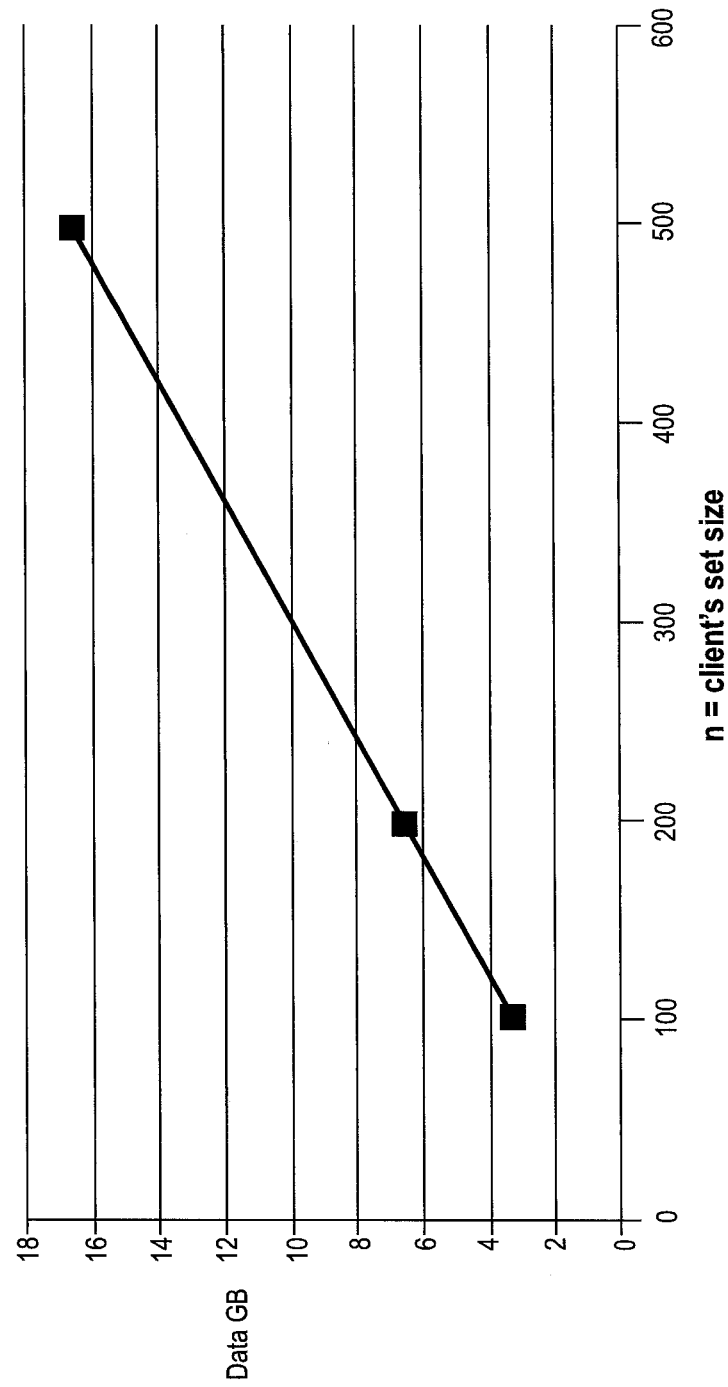
FIG. 7 is a graph illustrating computation cost versus n, the Server's set size, for the prototype system.
Figure 8:
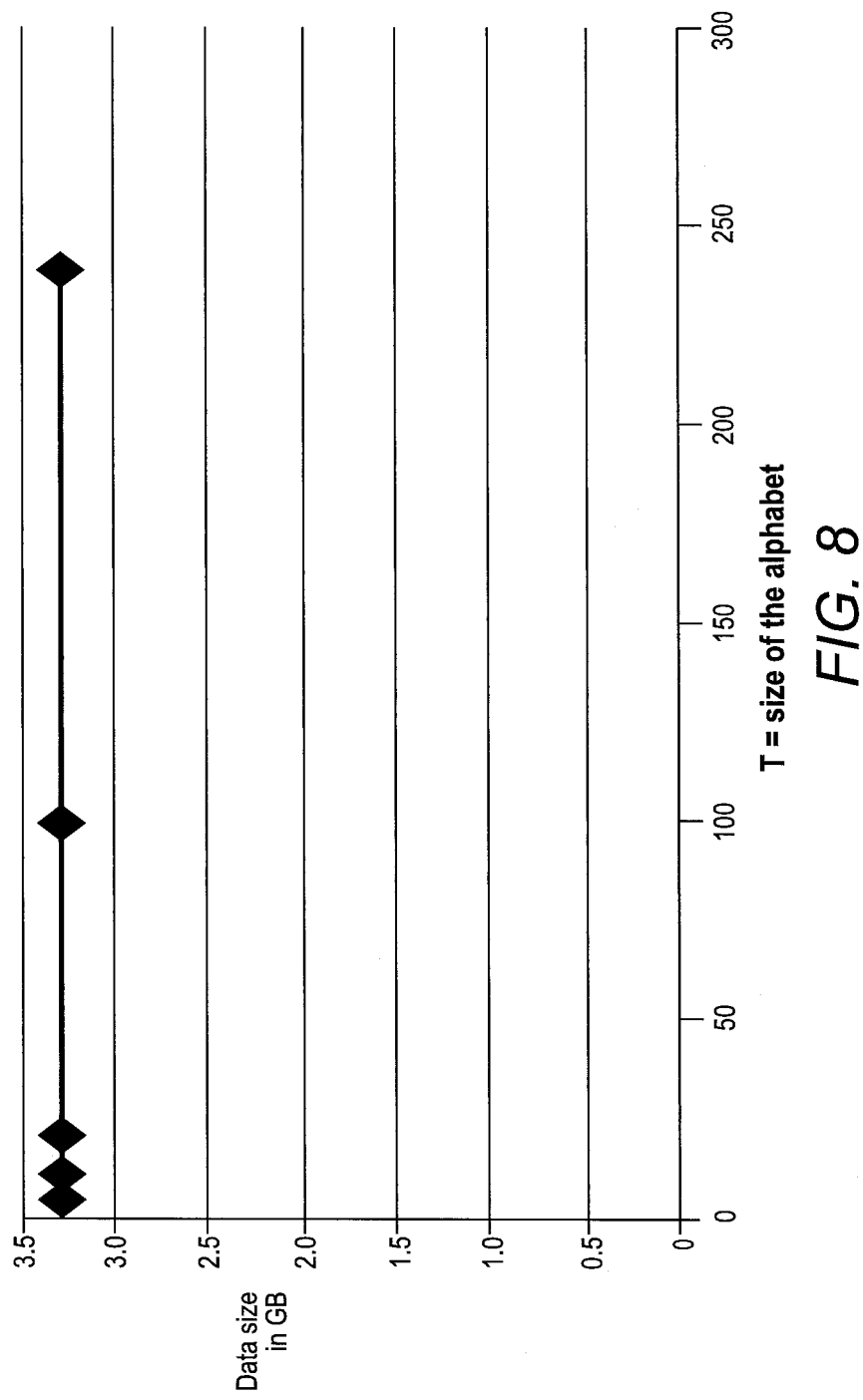
FIG. 8 is a graph illustrating computation cost versus T, the Word size, for the prototype system.

The variation in computation cost (data size) when changing the values of m, n and T are shown in FIGS. 6-8. FIG. 6 shows computation cost over m, the Client's set size. FIG. 7 shows computation cost over n, the Server's set size. FIG. 8 shows computation cost over T, the Word size.

These observations are in agreement with the theoretical analysis of the protocol complexities.

In this prototype example, files were used as a means to exchange data. Input and output operations are not efficient, but they have the advantage of being visually demonstrative. In another implementation (using Helib), direct buffers of bytes were sent to the server, which drastically improves the computation and the transfer time. It can be assumed that the same can be done with this implementation.

In this particular implementation, threads were not used. The main reason was to check the validity of our computation complexity. However parallelization could be used to improve performance. Most of our operations can be parallelized since the algorithm works by applying the same computation on the server vectors. This task can be distributed easily between n processors, thus decreasing by a factor n, the computation time for the server.

Some optimizations can also be done to reduce the complexity.

In other experiments, optimization of the computation of Hamming Distance was evaluated. The same client-server architecture was used as in the example above. The computation time and the transfer time were improved by a factor 100, from 10s to 120 ms, for example, by transferring compressed buffer and reducing as much as possible the use of files. These results show that it is possible to gain improvements in performance. These optimizations may seem small, but reducing the number of operations allows using smaller parameters for the cryptosystem, and improving basic operations time.

Helib is still a relatively new library, and not all functionalities described in BGV are implemented yet. For example, the modular reduction, meaning reducing the noise of a ciphertext at the expanse of the modulus, is not available. For the present implementation, this means that the maximum amount of noise generated needs to be taken into account and parameters that are able to decrypt with such noise are used. The next implementation of this library, will further improve the computation time, as it will be possible to work with smaller parameters. Alternatively, a dedicated library could be employed.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method for data matching, comprising: encrypting a first set of data elements to generate a first set of encrypted data elements, each of the encrypted data elements in the first set being formed by converting a respective one of the first set of data elements to a set of vectors and encrypting each vector with a public key of a fully homomorphic encryption scheme, each data element in the first set including a sequence of at least two characters drawn from an alphabet, each vector including vector elements, one vector element for each character in the data element;

receiving a second set of encrypted data elements, each of the encrypted data elements in the second set having been formed by converting a respective one of a second set of data elements to a set of vectors and encrypting each vector with the public key, each data element in the second set including a sequence of at least two characters drawn from the alphabet, each data element in the first set having a same number of characters as each data element in the second set;

for each of a plurality of pairs of encrypted data elements, each pair comprising an encrypted data element from the first set and an encrypted data elements second set, computing a comparison measure between the encrypted vectors of the encrypted data element in the second set and the encrypted vectors of the encrypted data element in the first set, wherein the comparison measure is based on a Hamming distance, the fully homomorphic encryption scheme using right rotation operations on encrypted similarity measure vectors to compute the Hamming distance;

for each encrypted data element in the first set, generating an obfuscated vector which renders the first encrypted data element indecipherable when the comparison measure does not meet a threshold for at least one of the pairs of data encrypted elements comprising that encrypted data element; and outputting the obfuscated vectors, whereby when the obfuscated vectors are decrypted with a private key of the fully homomorphic encryption scheme, only those data elements in the first set for which the comparison measure meets the threshold for at least one of the data elements in the second set are decipherable, the threshold of the comparison measure being set such those data elements in the first set which are t-fuzzy to elements of the second dataset are decipherable, where t is less than the number of characters in each data element;

wherein at least one of the computing of the comparison measures and generating of the obfuscated vectors is performed with a computer processor.

2. The method of claim 1, wherein the fully homomorphic encryption scheme provides for addition, multiplication and optionally right rotation operations to be performed on encrypted data.

3. The method of claim 1, wherein the fully homomorphic encryption scheme is based on a Brakerski-Gentry-Vaikuntanathan (BGV) encryption scheme.

4. The method of claim 1, wherein each data element in the first set includes at least three characters.

5. The method of claim 1, wherein for each data element in the first and second sets, the set of encrypted vectors consists of a same number of encrypted vectors.

6. The method of claim 5, wherein the number of encrypted vectors corresponds to a number of the characters in the alphabet.

7. The method of claim 1, wherein the conversion of each data element to a set of vectors comprises, for each character in the alphabet, generating a binary vector by comparing the character of the alphabet with each character in the sequence of characters and setting a corresponding vector element to a first binary value if there is a match, otherwise setting the corresponding vector element to a second binary value.

8. The method of claim 1, wherein for each data element in the first and second sets, each vector encrypted with the public key includes a same number of vector elements.

9. The method of claim 1, wherein the computing of the comparison measure comprises computing the encrypted similarity vector according to:

$$\{H^j_i\}_K = \{\Sigma^D_{\delta=1} r_i^\delta r'^\delta_j\}_K \quad (2)$$

where D represents the number of encrypted vectors for each data element and each i represents a data element in the second set, each j represents a data element in the first set, $r_i^\delta$ and $r'^\delta_j$ represent respective vectors of two data elements being compared, and K indicates encryption with the public key.

10. The method of claim 9, wherein the computing of the comparison measure further comprises computing an encrypted distance vector according to:

$$\{\Delta_H(X_i, Y_j)\}_K = \{T\}_K - \{\Sigma^T_{w=1} \text{rot}(H^j_i, w)\}_k \quad (3)$$

where $\{T\}_K$ is an encrypted vector in which all elements have a value of T, where T is a number of characters in each data element, and rot represents a homomorphic rotation operator, indexed by w.

11. The method of claim 1, wherein the generating of the obfuscated vectors comprises computing, for each of the encrypted data elements in the first set, a sum of the encrypted data element and a product which generates a null value when the comparison measure meets the threshold for at least one of the data elements in the second set and a random number when the comparison measure does not meet the threshold for at least one of the data elements in the second set.

12. The method of claim 11, wherein the comparison measure comprises an encrypted distance vector in which each element of the vector is a Hamming distance and the product is computed by subtracting an encrypted unitary vector from the encrypted distance vector, multiplying the result by a random number, and computing the product of the multiplied result over each of a set of encrypted unitary vectors, the encoded unitary vectors each representing a value of less than the threshold.

13. The method of claim 11, wherein the generating of the obfuscated vectors comprises computing, for each of the encrypted data elements $\{Y_j\}_K$ in the first set one of:

$$\{\Pi_{i=1}^m \Pi_{w=0}^{T-t} (\Delta_H(X_i, Y_j) - w) \cdot r\}_K + \{Y_j\}_K \quad (4)$$

where $\Delta_H(X_i, Y_j)$ is a vector which represents the computed comparison measure as a distance between one of the m data elements encrypted in the second set and the data element encrypted as $\{Y_j\}_K$ in the first set, each w is a unitary vector from 0 up to T−t, where t is the threshold, T is the number of characters in each element, r is a random vector, and K indicates encryption with the public key; and $$\{\Pi_{i=1}^m \Pi_{w=t}^T (\Delta_H^{inv}(X_i, Y_j) - w) \cdot r\}_K + \{Y_j\}_K \quad (5)$$

where $\Delta_H^{inv}(X_i, Y_j)$ is a vector which represents the computed comparison measure as a similarity between one of the m data elements encrypted in the second set and the data element encrypted as $\{Y_j\}_K$ in the first set.

14. The method of claim 1 wherein the first and second sets of encrypted data elements comprise encrypted license plate numbers.

15. The method of claim 1, wherein for each data element, the encrypted vectors comprise a respective vector for each character in the alphabet and the computing of the comparison measure between the encrypted vectors of the encrypted data element in the second set and the encrypted vectors of the encrypted data element in the first set comprises multiplying a respective pair of the encrypted vectors for each character in the alphabet.

16. A method for data matching, comprising:

encrypting a first set of data elements to generate a first set of encrypted data elements, each of the encrypted data elements in the first set being formed by converting a respective one of the first set of data elements to a set of vectors and encrypting each vector with a public key of a fully homomorphic encryption scheme, each data element in the first set including a sequence of characters drawn from an alphabet, each vector including vector elements, one vector element for each character in the data element;

receiving a second set of encrypted data elements, each of the encrypted data elements in the second set having been formed by converting a respective one of a second set of data elements to a set of vectors and encrypting each vector with the public key, each data element in the second set including a sequence of characters drawn from the alphabet:

for each of a plurality of pairs of encrypted data elements, each pair comprising an encrypted data element from the first set and an encrypted data element from the second set, computing a comparison measure between the encrypted vectors of the encrypted data element in the second set and the encrypted vectors of the encrypted data element in the first set, wherein the comparison measure is based on a Hamming distance, the fully homomorphic encryption scheme using right rotation operations on encrypted similarity measure vectors to compute the Hamming distance;

for each encrypted data element in the first set, generating an obfuscated vector which renders the first encrypted data element indecipherable when the comparison measure does not meet a threshold for at least one of the pairs of data encrypted elements comprising that encrypted data element; and outputting the obfuscated vectors, whereby when the obfuscated vectors are decrypted with a private key of the fully homomorphic encryption scheme, only those data elements in the first set for which the comparison measure meets the threshold for at least one of the data elements in the second set are decipherable, wherein at least one of the computing of the comparison measures and generating of the obfuscated vectors is performed with a computer processor.

17. The method of claim 16, wherein each data element in the first set has a same number of characters as each data element in the second set.

18. A computer program product comprising a non-transitory recording medium storing instructions, which when executed on a computer causes the computer to perform:

encrypting a first set of data elements to generate a first set of encrypted data elements, each of the encrypted data elements in the first set being formed by converting a respective one of the first set of data elements to a set of vectors and encrypting each vector with a public key of a fully homomorphic encryption scheme, each data element in the first set including a sequence of at least two characters drawn from an alphabet, each vector including vector elements, one vector element for each character in the data element;

receiving a second set of encrypted data elements, each of the encrypted data elements in the second set having been formed by converting a respective one of a second set of data elements to a set of vectors and encrypting each vector with the public key, each data element in the second set including a sequence of at least two characters drawn from the alphabet, each data element in the first set having a same number of characters as each data element in the second set;

for each of a plurality of pairs of encrypted data elements, each pair comprising an encrypted data element from the first set and an encrypted data elements second set, computing a comparison measure between the encrypted vectors of the encrypted data element in the second set and the encrypted vectors of the encrypted data element in the first set, wherein the comparison measure is based on a Hamming distance, the fully homomorphic encryption scheme using right rotation operations on encrypted similarity measure vectors to compute the Hamming distance;

for each encrypted data element in the first set, generating an obfuscated vector which renders the first encrypted data element indecipherable when the comparison measure does not meet a threshold for at least one of the pairs of data encrypted elements comprising that encrypted data element; and outputting the obfuscated vectors, whereby when the obfuscated vectors are decrypted with a private key of the homomorphic encryption scheme, only those data elements in the first set for which the comparison measure meets the threshold for at least one of the data elements in the second set are decipherable, the threshold of the comparison measure being set such those data elements in the first set which are t-fuzzy to elements of the second dataset are decipherable, where t is less than the number of characters in each data element.

19. A system comprising non-transitory memory which stores instructions and a processor in communication with the memory which executes the instructions, the instructions comprising:

encrypting a first set of data elements to generate a first set of encrypted data elements, each of the encrypted data elements in the first set being formed by converting a respective one of the first set of data elements to a set of vectors and encrypting each vector with a public key of a fully homomorphic encryption scheme, each data element in the first set including a sequence of at least two characters drawn from an alphabet, each vector including vector elements, one vector element for each character in the data element;

receiving a second set of encrypted data elements, each of the encrypted data elements in the second set having been formed by converting a respective one of a second set of data elements to a set of vectors and encrypting each vector with the public key, each data element in the second set including a sequence of at least two characters drawn from the alphabet, each data element in the first set having a same number of characters as each data element in the second set;

for each of a plurality of pairs of encrypted data elements, each pair comprising an encrypted data element from the first set and an encrypted data elements second set, computing a comparison measure between the encrypted vectors of the encrypted data element in the second set and the encrypted vectors of the encrypted data element in the first set, wherein the comparison measure is based on a Hamming distance, the fully homomorphic encryption scheme using right rotation operations on encrypted similarity measure vectors to compute the Hamming distance;

for each encrypted data element in the first set, generating an obfuscated vector which renders the first encrypted data element indecipherable when the comparison measure does not meet a threshold for at least one of the pairs of data encrypted elements comprising that encrypted data element; and outputting the obfuscated vectors, whereby when the obfuscated vectors are decrypted with a private key of the homomorphic encryption scheme, only those data elements in the first set for which the comparison measure meets the threshold for at least one of the data elements in the second set are decipherable, the threshold of the comparison measure being set such those data elements in the first set which are t-fuzzy to elements of the second dataset are decipherable, where t is less than the number of characters in each data element.

20. A system for data matching, comprising: instructions stored in memory for:
encrypting a first set of data elements to generate a first set of encrypted data elements, the encrypting comprising converting each of the first set of data elements to a respective set of vectors and encrypting each vector in the set of vectors with a public key of a fully homomorphic encryption scheme, each data element in the first set of data elements including a sequence of characters drawn from an alphabet, each vector including a respective vector element for each character in the data element;
receiving a second set of encrypted data elements, each of the encrypted data elements in the second set having been formed by converting a respective one of a second set of data elements to a set of vectors and encrypting each vector with the public key, each data element in the second set including a sequence of characters drawn from the alphabet;
for each pair of encrypted data elements from the first and second sets, computing a comparison measure between the encrypted vectors of the encrypted data element in the second set and the encrypted vectors of the encrypted data element in the first set, wherein the comparison measure is based on a Hamming distance, the fully homomorphic encryption scheme using right rotation operations on encrypted similarity measure vectors to compute the Hamming distance;
for each encrypted data element in the first set, generating an obfuscated vector which renders the first encrypted data element indecipherable when the comparison measure does not meet a threshold for at least one of the pairs of data elements comprising that encrypted data element; and
outputting the obfuscated vectors, whereby when the obfuscated vectors are decrypted with a private key of the fully homomorphic encryption scheme, only those data elements in the first set for which the comparison measure meets the threshold are decipherable; and a processor which implements the instructions.

21. A method for data matching, comprising: with a server computer, encrypting a first set of data elements to generate a first set of encrypted data elements, the encrypting comprising converting each of the first set of data elements to a respective set of vectors and encrypting each vector in the set of vectors with a public key of a fully homomorphic encryption scheme, each data element in the first set of data elements including a sequence of at least two characters drawn from an alphabet, each vector including a respective vector element for each character in the data element;
with a client computer, encrypting a second set of data elements to generate a second set of encrypted data elements, comprising converting each of the second set of data elements to a respective set of vectors and encrypting each vector in the set of vectors with the public key, each data element in the second set of data elements including a sequence of characters drawn from the alphabet, each vector including a respective vector element for each character in the data element;
with the server computer;
receiving the second set of encrypted data elements; for each of a plurality of pairs of encrypted data elements, each pair comprising ah encrypted data element from the first set and an encrypted data element from the second set, computing a comparison measure between the encrypted vectors of the encrypted data element in the second set and the encrypted vectors of the encrypted data element in the first set, the computing of the comparison measure comprising multiplying pairs of the encrypted vectors and summing the multiplied vectors, wherein the comparison measure is based on a Hamming distance, the fully homomorphic encryption scheme using right rotation operations on encrypted similarity measure vectors to compute the Hamming distance;
for each encrypted data element in the first set, generating an obfuscated vector which renders the first encrypted data element indecipherable when the comparison measure does not meet a threshold for at least one of the pairs of data elements comprising that encrypted data element; and
outputting the obfuscated vectors; and
with the client computer, decrypting the obfuscated vectors with a private key of the fully homomorphic encryption scheme, whereby only those data elements in the first set for which the comparison measure meets the threshold for at least one of the data elements in the second set are decipherable.

* * * * *